United States Patent
Nakajima et al.

(10) Patent No.: US 8,270,542 B2
(45) Date of Patent: Sep. 18, 2012

(54) METHOD FOR EVALUATING QUALITY OF READ SIGNAL AND APPARATUS FOR READING INFORMATION

(75) Inventors: Takeshi Nakajima, Nara (JP);
Harumitsu Miyashita, Mino (JP);
Hiromichi Ishibashi, Ibaraki (JP);
Shigeru Furumiya, Himeji (JP)

(73) Assignee: Panasonic Corporation, Osaka (JP)

( * ) Notice: Subject to any disclaimer, the term of this patent is extended or adjusted under 35 U.S.C. 154(b) by 124 days.

(21) Appl. No.: 12/510,419

(22) Filed: Jul. 28, 2009

(65) Prior Publication Data
US 2010/0014405 A1    Jan. 21, 2010

Related U.S. Application Data

(63) Continuation of application No. 10/198,604, filed on Jul. 19, 2002, now abandoned.

(30) Foreign Application Priority Data

Jul. 19, 2001  (JP) .................................. 2001-219372
Aug. 22, 2001  (JP) .................................. 2001-251138

(51) Int. Cl.
*H04L 27/06*    (2006.01)

(52) U.S. Cl. ........................................ 375/341; 375/316

(58) Field of Classification Search .................. 375/316, 375/341
See application file for complete search history.

(56) References Cited

U.S. PATENT DOCUMENTS

| | | | |
|---|---|---|---|
| 5,331,665 A | 7/1994 | Busschaert et al. | |
| 5,563,864 A | 10/1996 | Kobayashi et al. | |
| 5,889,784 A | 3/1999 | Rogers | |
| 5,907,527 A | 5/1999 | Tsutsui | |
| 5,938,791 A | 8/1999 | Narahara | |
| 5,991,914 A | 11/1999 | Honma | |
| 5,995,465 A | 11/1999 | Hayashi et al. | |
| 6,278,748 B1 | 8/2001 | Fu et al. | |

(Continued)

FOREIGN PATENT DOCUMENTS

JP    2000200467 A    7/2000

OTHER PUBLICATIONS

Jonathan D. Coker et al., "Magnetic Characterization Using Elements of PRML Channel", IEEE Transactions on Magnetics, vol. 27, No. 6, pp. 4544-4548 (1991).

*Primary Examiner* — Aristocratis Fotakis
*Assistant Examiner* — Freshteh N Aghdam
(74) *Attorney, Agent, or Firm* — McDermott Will & Emery LLP

(57) ABSTRACT

A most probable path is selected from a number n (where $n \geq 2$) of paths of state transitions occurring from a first state $S_{k-j}$ (where $k \geq 3$ and $j \geq 2$) at a time k–j into a second state $S_k$ at a time k. The method includes the steps of detecting predetermined combinations of the first and second states $S_{k-j}$ and $S_k$ defining the n probable paths in a predetermined period j between the times k–j and k, and evaluating the reliability of a read signal, decoded in the period j, by |Pa–Pb|. Pa and Pb indicate the probabilities of state transition of first and second state transition paths in the period j. The first and second state transition paths are estimated to be the most probable and the second most probable, respectively, among the n probable paths defined by the combinations detected.

1 Claim, 17 Drawing Sheets

U.S. PATENT DOCUMENTS

| | | |
|---|---|---|
| 6,295,256 B1 | 9/2001 | Kimikawa et al. |
| 6,337,889 B1 | 1/2002 | Mita et al. |
| 6,404,577 B1 | 6/2002 | Sobey |
| 6,477,125 B1 | 11/2002 | Hayami |
| 6,577,566 B1 | 6/2003 | Tomita |
| 6,637,004 B1 * | 10/2003 | Mizuno et al. ............ 714/796 |
| 6,697,443 B1 * | 2/2004 | Kim et al. ............ 375/341 |
| 6,721,254 B1 | 4/2004 | Yamaguchi |
| 2001/0019522 A1 | 9/2001 | Mita et al. |
| 2001/0028614 A1 | 10/2001 | Furukawa |
| 2002/0056744 A1 * | 5/2002 | Uchida et al. ............ 235/375 |
| 2002/0114250 A1 * | 8/2002 | Fujimoto et al. ............ 369/59.22 |

* cited by examiner

METHOD FOR EVALUATING QUALITY OF READ SIGNAL AND APPARATUS FOR READING INFORMATION

CROSS-REFERENCE TO RELATED APPLICATIONS

This application is a continuation of U.S. patent application Ser. No. 10/198,604, filed Jul. 19, 2002, the disclosure of which is incorporated herein by reference.

BACKGROUND OF THE INVENTION

1. Field of the Invention

The present invention relates to a method for evaluating the quality of a digital signal that has been read out from a storage medium and then decoded by a maximum likelihood decoding technique, and also relates to an apparatus for reading information from a storage medium and performing such quality evaluation on the read signal.

2. Description of the Related Art

Recently, various types of apparatuses (such as hard disk drive (HDD), optical disk drive and magneto-optical disk drive) for reading digital information from a storage medium have been used extensively in audiovisual appliances, personal computers and so on.

FIG. 1 is a block diagram showing a configuration for a part of a conventional optical disk drive 900. A light beam that has been reflected from an optical disk 1 is converted by an optical head 2 into a read signal. The read signal has its waveform shaped by a waveform equalizer 3 and then digitized by a comparator 4. The threshold value of the comparator 4 is normally subjected to a feedback control so that the output digital signals of the comparator 4 equals zero when integrated together.

In the optical disk drive 900, normally a phase-locked loop (PLL) circuit generates a clock signal that is synchronized with a read signal. A clock signal of that type is termed "a read clock signal". As shown in FIG. 1, the PLL circuit includes a phase detector 5, a low-pass filter (LPF) 6 and a voltage controlled oscillator (VCO) 7. To generate the read clock signal, the phase detector 5 detects a difference in phase between the output digital signal of the comparator 4 and an output clock signal of the VCO 7. The phase difference detected is averaged by the LPF 6. In accordance with the output of the LPF 6, the control voltage of the VCO 7 is determined. In this manner, the oscillation frequency of the VCO 7 is subjected to a feedback control so that the phase difference output from the phase detector 5 always equals zero. Thus, the VCO 7 can output a clock signal that is synchronized with the read signal. By using a PLL circuit like this, even if the disk has some degree of eccentricity, for example, a clock signal can be extracted constantly so as to be synchronized with the read signal.

The read clock signal is used to determine whether the recorded code (i.e., digital information) is one or zero. More specifically, the digital information can be read out by determining whether or not each detection pulse of the comparator 4 falls within a window width defined by the read clock signal. As used herein, the "detection pulse" of the comparator 4 refers to a portion of the output digital signal of the comparator 4 that exceeds the predetermined threshold value.

However, the output detection pulse of the comparator 4 might deviate from the window width of the read clock signal due to various factors including intersymbol interference occurring in the read signal, the distortion of a recording mark, circuit noise and a control residual of the PLL. In that case, an error occurs. Such a time lag created between the detection pulse of the comparator 4 and the read clock signal is called a "jitter".

In reading digital information by the technique described above, the quality (which is represented in terms of an error rate) of the read signal can be evaluated by using the distribution of jitter. The jitter distribution may be supposed to form a normal distribution having a mean of zero. In that case, the error rate Pj ($\sigma$/Tw) is given by $$Pj(\sigma/Tw) = 2\text{erfc}\left(\frac{Tw/2}{\sigma}\right) \quad (1)$$

$$\text{erfc}(z) = \frac{1}{\sqrt{2\pi}} \int_z^\infty \exp\left(-\frac{u^2}{2}\right) du \quad (2)$$

where $\sigma$ is the standard deviation of the jitter distribution that is supposed to be a normal distribution and Tw is the window width.

FIG. 2 is a graph showing a relationship between the jitter and the bit error rate (BER). As can be seen from FIG. 2, as the standard deviation of the jitter increases, the BER also increases. The jitter of a read signal can be actually measured with a time interval analyzer (TIA). Accordingly, even if no errors have actually occurred, the quality of the signal can also be evaluated by the jitter standard deviation $\sigma$ per the window width Tw. Thus, it is possible to predict the probability of occurrence of errors (which will be herein referred to as an "error probability"). For that reason, by measuring the standard deviation of the jitter, the performance of a given drive, a storage medium or an optical head can be checked and tested. Also, if the parameters of an equalizer are controlled in such a manner as to decrease the standard deviation of the jitter, then a read operation can be performed even more constantly.

In the technique described above, digital information is directly obtained from the output digital signal of the comparator 4. According to another known technique on the other hand, digital information may also be obtained by a maximum likelihood decoding method. Examples of known maximum likelihood decoding methods include a partial response maximum likelihood (PRML) method. In the PRML method, data is read or written from/on a storage medium having a high storage capacity with the potential occurrence of intersymbol interference fully taken into account. More specifically, a signal that has been read out from such a high-capacity storage medium is subjected, by a waveform equalizer, a digital filter and so on, to a partial response equalization so as to have a predetermined frequency characteristic. Then, the PR equalized and filtered signal is decoded into most likely (or most probable) digital data by a Viterbi decoding technique, for example. According to the PRML method, data can be decoded at a low error rate even from a read signal with a low signal-to-noise ratio (SNR) or a read signal that is affected by the intersymbol interference relatively seriously.

In a maximum likelihood decoding method like this, data is decoded from a read signal by selecting a most probable state transition path. In general, a quantity representing the probability of a state transition that leads to a state Sn (where n is a state number) at a time k is defined by the following Equation (3):

$$L^{Sn} = \sum_{i=0}^{k} (y_i - \text{level}_v)^2 \quad (3)$$

where $y_i$ is the actual value of the read signal (or digital sample data) at a time i and level$_v$ is an expected ideal value of the read signal.

In a maximum likelihood decoding method, a state transition path having the minimum probability quantity as represented by Equation (3) is selected. Unlike the above-described technique of decoding the data as one or zero by determining whether or not the detection pulse falls within the window width at each point in time k, a Euclidean distance of $(y_k - \text{level}_v)^2$ is obtained from the data that is sampled at each point in time k by reference to a read clock signal according to the maximum likelihood decoding method. Then, the data is decoded based on the Euclidean distance. Accordingly, the decoded result obtained by the maximum likelihood decoding method is also affected by a past sampled value $y_k$ of a read signal.

In this maximum likelihood decoding method, even when two read signals have the same jitter standard deviation $\sigma$, errors may or may not have occurred in the read signals. For that reason, it is difficult to estimate the error rate of the decoded digital data, obtained by the maximum likelihood decoding method, by the jitter standard deviation $\sigma$ of the read signal. Accordingly, an error rate estimating method (i.e., a signal quality evaluating method), which is more suitable to the maximum likelihood decoding method, needs to be used.

A method for evaluating the quality of a signal that has been decoded by the maximum likelihood decoding method is disclosed in Japanese Laid-Open Publication No. 10-21651, for example. The apparatus disclosed in Japanese Laid-Open Publication No. 10-21651 obtains a difference in likelihood between two state transition paths, having a minimum Euclidean distance between them, and then processes this difference by a statistical method, thereby evaluating the quality of the signal.

More specifically, to obtain a difference in likelihood between two paths that result in the same state at a time k, the sums of branch metrics of two survived paths that were regarded as most likely for two mutually different states at the previous time k−1 are used. However, these sums of branch metrics at the time k−1 might be those of unwanted paths. For example, a path other than the path in question (i.e., a path having likelihood to be checked) may have been selected by mistake before the time k−1. Japanese Laid-Open Publication No. 10-21651 does disclose a technique of selecting two paths having the minimum Euclidean distance between them and obtaining a difference in likelihood between these two paths. However, Japanese Laid-Open Publication No. 10-21651 does not disclose any specific method for calculating the target likelihood values of these two paths with more certainty.

SUMMARY OF THE INVENTION

In order to overcome the problems described above, preferred embodiments of the present invention provide a method and apparatus for evaluating the quality of a read signal by using indices that are correlated with the error rate of digital data decoded by the maximum likelihood decoding method.

A preferred embodiment of the present invention provides a method for evaluating the quality of a read signal that has been decoded by a maximum likelihood decoding method. In this method, a most probable state transition path is preferably selected from a number n (where n is an integer equal to or greater than two) of state transition paths that represent n probable transitions from a first state $S_{k-j}$ (where k is an integer equal to or greater than three and j is an integer equal to or greater than two) at a time k−j into a second state $S_k$ at a time k. The method preferably includes the step of detecting predetermined combinations of the first and second states $S_{k-j}$ and $S_k$ that define the n probable state transition paths in a predetermined period j between the times k−j and k. The method preferably further includes the step of evaluating the reliability of the decoded signal, obtained in the predetermined period j, by using |Pa−Pb|. Pa and Pb are indices indicating the respective probabilities of state transition of first and second state transition paths in the predetermined period j. The first and second state transition paths are estimated to be the most probable and the second most probable, respectively, among the n probable state transition paths that are defined by the predetermined combinations detected.

In one preferred embodiment of the present invention, the step of evaluating the reliability preferably includes the steps of defining the index Pa by differences between expected values shown by the first state transition path and actual sample values in the predetermined period j, and defining the index Pb by differences between expected values shown by the second state transition path and the actual sample values in the predetermined period j.

In this particular preferred embodiment, the step of evaluating the reliability preferably includes the steps of obtaining the index Pa as a sum of squares of differences between the expected values $l_{k-j+1}, \ldots, l_{k-1}$ and $l_k$ shown by the first state transition path and the actual sample values $y_{k-j+1}, \ldots, y_{k-1}$ and $y_k$ in the predetermined period j and obtaining the index Pb as a sum of squares of differences between the expected values $m_{k-j+1}, \ldots, m_{k-1}$ and $m_k$ shown by the second state transition path and the actual sample values $y_{k-j+1}, \ldots, y_{k-1}$ and $y_k$ in the predetermined period j.

In another preferred embodiment of the present invention, the number n is preferably two.

In still another preferred embodiment, a Euclidean distance between the first and second state transition paths is preferably a minimum value.

In yet another preferred embodiment, the method preferably further includes the step of detecting a variation in the reliability of the decoded signal by measuring |Pa−Pb| a number of times.

In this particular preferred embodiment, the step of detecting the variation in the reliability may include the step of deriving a standard deviation of a |Pa−Pb| distribution as the variation.

Alternatively, the step of detecting the variation in the reliability may include the step of deriving a standard deviation and an average of a |Pa−Pb| distribution as the variation.

As another alternative, the step of detecting the variation in the reliability may include the step of detecting a frequency of occurrence at which |Pa−Pb| exceeds a predetermined range.

In yet another preferred embodiment, the method may further include the step of decoding a read signal in which a recorded code has a minimum polarity inversion interval of two and which has been subjected to a PR (C0, C1, C0) equalization.

Alternatively, the method may further include the step of decoding a read signal in which a recorded code has a minimum polarity inversion interval of two and which has been subjected to a PR (C0, C1, C1, C0) equalization.

As another alternative, the method may further include the step of decoding a read signal in which a recorded code has a minimum polarity inversion interval of two and which has been subjected to a PR (C0, C1, C2, C1, C0) equalization.

In yet another preferred embodiment, the step of evaluating the reliability may include the step of obtaining |Pa−Pb| without calculating squares of the actual sample values.

Another preferred embodiment of the present invention provides an apparatus for reading information. The apparatus preferably includes gain controller, first waveform equalizer, read clock signal generator, A/D converter, maximum likelihood decoder and differential metric calculator. The gain controller preferably adjusts an amplitude value of a read signal. The first waveform equalizer preferably shapes the waveform of the read signal so that the read signal has a predetermined equalization characteristic. The read clock signal generator preferably generates a read clock signal that is synchronized with the read signal. The A/D converter preferably generates and outputs sampled data by sampling the read signal in response to the read clock signal. The maximum likelihood decoder preferably decodes the sampled data into most likely digital information. The differential metric calculator preferably obtains |Pa−Pb|. Pa and Pb are indices indicating respective probabilities of state transition of first and second state transition paths in a predetermined period. The first and second state transition paths are estimated by the maximum likelihood decoder to be the most probable and the second most probable, respectively.

In one preferred embodiment of the present invention, the apparatus preferably further includes a second waveform equalizer for shaping the waveform of the read signal differently from the first waveform equalizer so that the read signal has another predetermined equalization characteristic. In that case, the read clock signal is preferably generated from the read signal that has had its waveform shaped by the second waveform equalizer.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Embodiment 1

Hereinafter, a method for evaluating the quality of a read signal and an apparatus for reading information according to preferred embodiments of the present invention will be described with reference to the accompanying drawings.

First, a read signal quality evaluating method according to a preferred embodiment of the present invention will be described. In the preferred embodiments to be described below, a code having a minimum polarity inversion interval of two, e.g., a code defined by a (1, 7) RLL modulation method, is used as the recorded code. That is to say, any recorded code always has two or more consecutive zeros or ones. Also, a signal is supposed to be decoded by a PRML method in which the frequency characteristics of read and write systems substantially correspond to a PR (1, 2, 2, 1) equalization characteristic as a whole. Hereinafter, a specific decoding procedure will be described.

Suppose recorded codes (each being made up of zeros or ones) are denoted by:

Current recorded code: $b_k$;
Recording code at the previous time: $b_{k-1}$;
Recording code at the second last time: $b_{k-2}$; and
Recording code at the third last time: $b_{k-3}$ An ideal value $Level_v$ of a read signal that has been subjected to the PR (1, 2, 2, 1) equalization is given by:

$$Level_v = b_{k-3} + 2b_{k-2} + 2b_{k-1} + b_k \qquad (4)$$

where k is an integer, representing the time and v is an integer of 0 to 6. In the PR (1, 2, 2, 1) equalization, there are seven ideal sample values (or expected values) Level$_v$ (where $0 \leq v \leq 6$) depending on the combination of the recorded codes.

Next, the state transitions of the recorded codes will be described. A state at the time k is represented by S ($b_{k-2}$, $b_{k-1}$, $b_k$) and a state at the previous time k−1 is represented by S ($b_{k-3}$, $b_{k-2}$, $b_{k-1}$). The following Table 1 is a table of state transitions that is compiled by obtaining possible combinations of states at the times k−1 and k. As described above, a modulation technique that defines the minimum inversion interval at two (i.e., at least two zeros or ones appear consecutively) is adopted in this preferred embodiment. Accordingly, the possible state transitions that a recorded code can make are limited to the following ten:

TABLE 1

| State S ($b_{k-3}$, $b_{k-2}$, $b_{k-1}$) at time k − 1 | State S ($b_{k-2}$, $b_{k-1}$, $b_k$) at time k | $b_k$/Level$_v$ |
|---|---|---|
| S (0, 0, 0) | S (0, 0, 0) | 0/0 |
| S (0, 0, 0) | S (0, 0, 1) | 1/1 |
| S (0, 0, 1) | S (0, 1, 1) | 1/3 |
| S (0, 1, 1) | S (1, 1, 0) | 0/4 |
| S (0, 1, 1) | S (1, 1, 1) | 1/5 |
| S (1, 0, 0) | S (0, 0, 0) | 0/1 |
| S (1, 0, 0) | S (0, 0, 1) | 1/2 |
| S (1, 1, 0) | S (1, 0, 0) | 0/3 |
| S (1, 1, 1) | S (1, 1, 0) | 0/5 |
| S (1, 1, 1) | S (1, 1, 1) | 1/6 |

Figure 3:
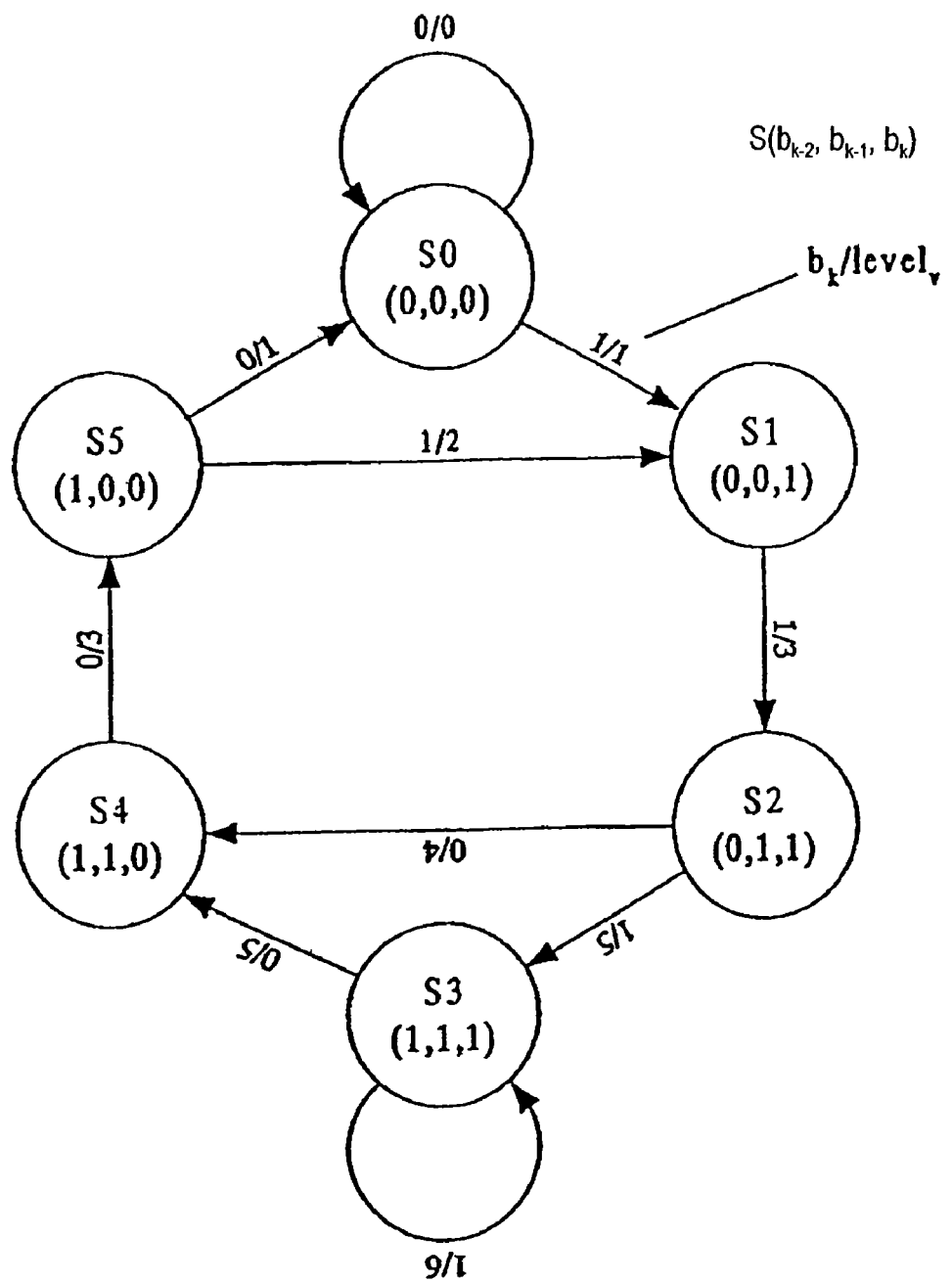
FIG. 3 is a state transition diagram that is defined by the constraints, including a minimum polarity inversion interval of two and the use of a PR (1, 2, 2, 1) equalization technique, according to a preferred embodiment of the present invention.
Figure 4:
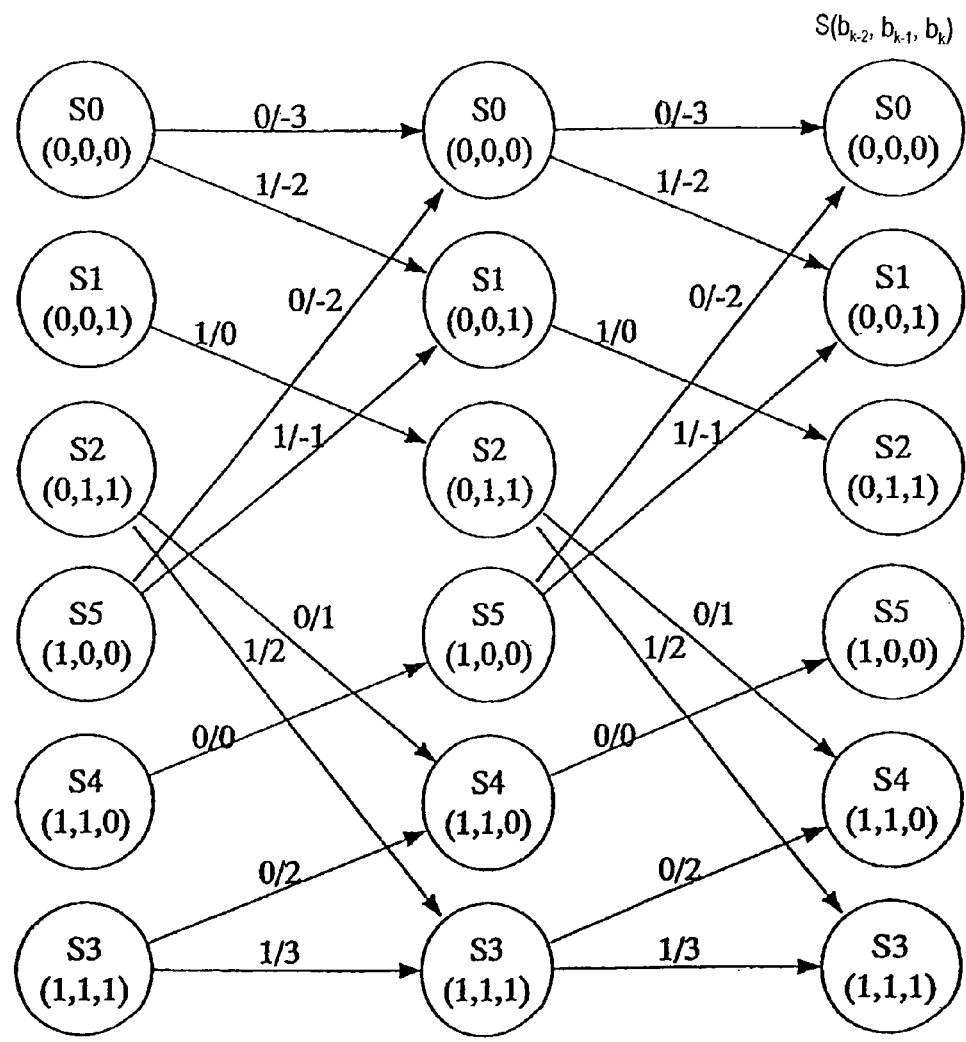
FIG. 4 is a trellis diagram that is defined by the constraints, including the minimum polarity inversion interval of two and the use of the PR (1, 2, 2, 1) equalization technique, in the preferred embodiment of the present invention.

In the following description, the states S (0, 0, 0)$_k$, S (0, 0, 1)$_k$, S (0, 1, 1)$_k$, S (1, 1, 1)$_k$, S (1, 1, 0)$_k$, S (1, 0, 0)$_k$ and so on at the time k will be identified by S0$_k$, S1$_k$, S2$_k$, S3$_k$, S4$_k$, S5$_k$ and so on, respectively, for the sake of simplicity. The state transitions that may occur in the period between the time k−1 and the time k (i.e., a period of time corresponding to one cycle T of a read clock signal) are represented by the state transition diagram shown in FIG. 3. When the state transition diagram shown in FIG. 3 is expanded with respect to the time axis, the trellis diagram shown in FIG. 4 is obtained.

Figure 5:
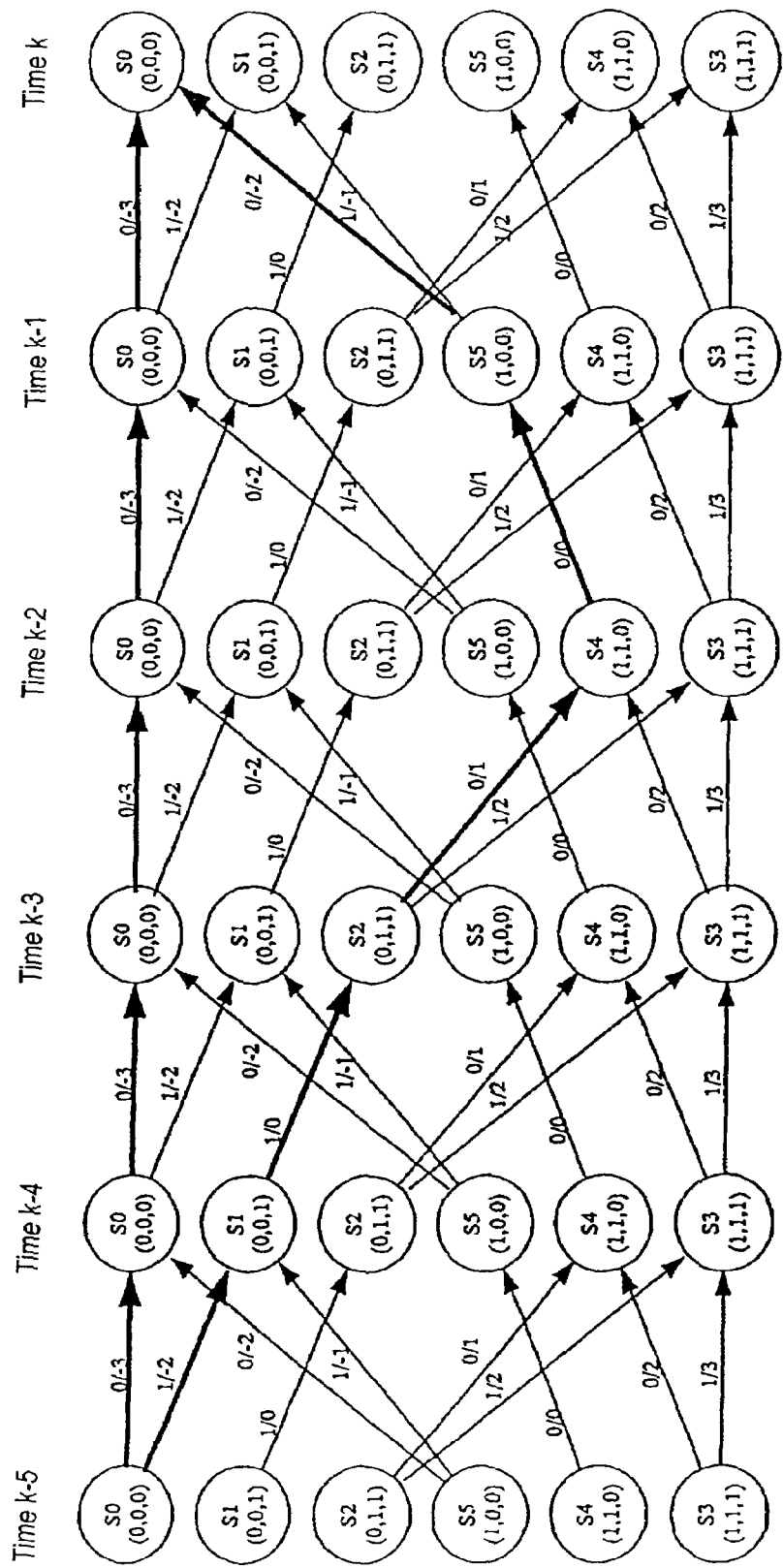
FIG. 5 is a diagram showing two possible state transition paths between states $S0_k$ and $S0_{k-5}$ that are extracted from the trellis diagram shown in FIG. 4.

Look at the state S0$_k$ at the time k and the state S0$_{k-5}$ at a time k−5 shown in FIG. 5. In FIG. 5, two possible paths of state transitions that can occur between the states S0$_k$ and S0$_{k-5}$ are indicated by the bold arrows. One A of the two possible state transition paths goes through the states S0$_{k-5}$, S0$_{k-4}$, S0$_{k-3}$, S0$_{k-2}$, S0$_{k-1}$ and S0$_k$, while the other possible state transition path B goes through the states S0$_{k-5}$, S1$_{k-4}$, S2$_{k-3}$, S4$_{k-2}$, S5$_{k-1}$ and S0$_k$. In FIGS. 4 and 5, (recorded code/Level$_v$) is shown for each state transition. In this case, Level$_v$ is supposed to be any value between −3 and 3. That is to say, the Level$_v$ values of −3, −2, −1, 0, 1, 2 and 3 correspond to Level$_0$, Level$_1$, Level$_2$, Level$_3$, Level$_4$, Level$_5$, and Level$_6$, respectively.

In this manner, if the states at the times k−5 and k are S0$_{k-5}$ and S0$_k$, respectively, it is estimated that the state transitions should have occurred along one of the two paths A and B. That is to say, if the decoded result obtained, i.e., the data that has been decoded in a period between the times k−7 and k, is ($C_{k-7}$, $C_{k-6}$, $C_{k-5}$, $C_{k-4}$, $C_{k-3}$, $C_{k-2}$, $C_{k-1}$, $C_k$)=(0, 0, 0, x, x, 0, 0, 0) (where x is either zero or one), then the state transition path A or B is estimated to be the most probable one.

If the states S0$_k$ and S0$_{k-5}$ are detected at the times k and k−5, respectively (i.e., if the decoded result obtained is (0, 0, 0, x, x, 0, 0, 0)), then it is necessary to determine which is more probable, the path A or the path B. This decision can be made by comparing the sum of errors (or differences) between ideal sample values (i.e., expected values) shown by the path A and actual sample values with that of errors between ideal sample values (i.e., expected values) shown by the path B and the actual sample values. More specifically, for each of these two paths A and B, errors between expected values Level$_v$ at the times k−4, k−3, k−2, k−1 and k and the actual values $y_{k-4}$, $y_{k-3}$, $y_{k-2}$, $y_{k-1}$ and $y_k$ of the read signal are obtained. The squares of these errors are summed up, thereby obtaining a sum of squared errors for each of the paths A and B. By comparing these sums of squared errors of the paths A and B with each other, it is possible to determine which of the two paths A and B is the more probable one.

In this case, the sum of squared errors between the expected values $l_{k-4}$, $l_{k-3}$, $l_{k-2}$, $l_{k-1}$ and $l_k$ (i.e., 0, 0, 0, 0, 0) shown by the path A and the values $y_{k-4}$, $y_{k-3}$, $y_{k-2}$, $y_{k-1}$ and $y_k$ of the read signal at the times k−4, k−3, k−2, k−1 and k, respectively, is identified by Pa. On the other hand, the sum of squared errors between the expected values $m_{k-4}$, $m_{k-3}$, $m_{k-2}$, $m_{k-1}$ and $m_k$ (i.e., 1, 3, 4, 3, 1) shown by the path B and the values $y_{k-4}$, $y_{k-3}$, $y_{k-2}$, $y_{k-1}$ and $y_k$ of the read signal at the times k−4, k−3, k−2, k−1 and k, respectively, is identified by Pb. These sums of squared errors Pa and Pb are respectively given by the following Equations (5) and (6):

$$Pa = (y_{k-4}-0)^2 + (y_{k-3}-0)^2 + (y_{k-2}-0)^2 + (y_{k-1}-0)^2 + (y_k-0)^2 \quad (5)$$

$$Pb = (y_{k-4}-1)^2 + (y_{k-3}-3)^2 + (y_{k-2}-4)^2 + (y_{k-1}-3)^2 + (y_k-1)^2 \quad (6)$$

The sum of squared errors Pa obtained in this manner is an index indicating the probability of state transitions of the path A in the predetermined period between the times k−5 and k. That is to say, the smaller the Pa value, the more probable the path A will be. On the other hand, the sum of squared errors Pb obtained in this manner is an index indicating the probability of state transitions of the path B in the predetermined period between the times k−5 and k. That is to say, the smaller the Pb value, the more probable the path B will be. Also, if the Pa or Pb value is zero, then the path A or B is estimated to be the most probable one.

Next, it will be described what the difference Pa−Pb between the Pa and Pb values means. A maximum likelihood decoder does not hesitate to choose the path A if Pa<<Pb or the path B if Pa>>Pb. However, if Pa=Pb, then either the path A or the path B may be chosen and the decoded result may or may not be true. Thus, the Pa−Pb value may be used as a measure of the reliability of the decoded result. That is to say, the greater the absolute value of Pa−Pb, the higher the reliability of the decoded result should be. On the other hand, the closer to zero the absolute value of Pa−Pb, the lower the reliability of the decoded result should be.

Figure 6A:
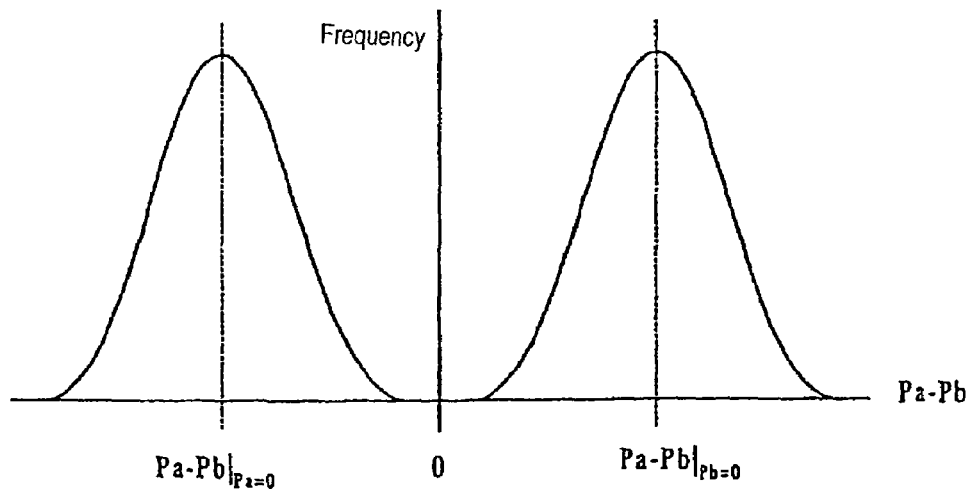
FIGS. 6A and 6B are graphs schematically showing the distributions of the reliability Pa−Pb of the decoded result.
Figure 6B:
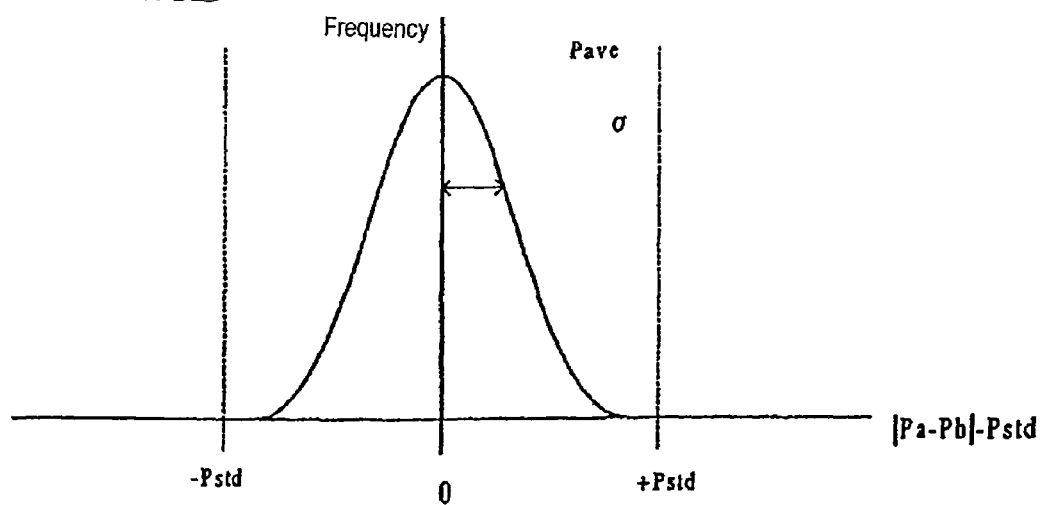

This Pa−Pb index indicating the reliability of the decoded result is used to evaluate the quality of the read signal. For that purpose, by obtaining the Pa−Pb values for a predetermined amount of time or a predetermined number of times based on the decoded results, a Pa−Pb distribution is obtained. FIGS. 6A and 6B schematically illustrate the Pa−Pb distributions. Specifically, FIG. 6A shows a Pa−Pb distribution where noise is superposed on the read signal. As shown in FIG. 6A, this distribution has two peaks. One of the two peaks corresponds to a frequency of occurrence that reaches a local maximum value when Pa=0. The other peak corresponds to a frequency of occurrence that reaches a local maximum value when Pb=0. The Pa−Pb value corresponding to the zero Pa value will be herein identified by −Pstd and the Pa−Pb value corresponding to the zero Pb value will be herein identified by Pstd. When Pstd is subtracted from the absolute value of Pa−Pb (i.e., when |Pa−Pb|−Pstd is calculated), the distribution shown in FIG. 6B is obtained.

By supposing this distribution to be a normal distribution, the standard deviation σ and the average Pave of the distribution are obtained. The standard deviation σ and average Pave of this distribution may be used to estimate a bit error rate. For example, if the estimated |Pa−Pb| distribution is curved gently and defined by a function that may have a value of zero or less (i.e., unless the frequency of occurrence of |Pa−Pb|=0 is zero), decoding errors may be regarded as occurring at a frequency of occurrence that corresponds to the probability at which the function becomes zero or less. In that case, the error probability P (σ, Pave) may be defined by the following Equation (7) using the standard deviation σ and the average Pave:

$$P(\sigma, \text{Pave}) = \text{erfc}(\text{Pstd} + \text{Pave}/\sigma) \tag{7}$$

In this manner, the error rate of the digital decoded result obtained by a maximum likelihood decoding method can be estimated by using the average Pave and the standard deviation σ that have been derived from the distribution of Pa−Pb. In other words, the average Pave and the standard deviation σ may be used as indices to the quality of the read signal. In the example described above, the |Pa−Pb| distribution is supposed to be a normal distribution. But if it is difficult to regard the |Pa−Pb| distribution as a normal distribution, then it is possible to count how many times the |Pa−Pb| values are equal to or smaller than a predetermined reference value instead of deriving the average Pave and the standard deviation σ as described above. The count obtained in this manner may be used as an index indicating the degree of variance of the |Pa−Pb| values.

According to the preferred embodiment described above, if a state transition has occurred from a first predetermined state (e.g., $S0_{k-5}$) into a second predetermined state (e.g., $S0_k$) during a predetermined period, the absolute value of the difference |Pa−Pb| between the probabilities of two possible paths in the predetermined period is calculated, thereby evaluating the reliability of the decoded result. Furthermore, by measuring the |Pa−Pb| values a number of times, a variance (or distribution) representing the degree of reliability |Pa−Pb| of the decoded result can be obtained. In this manner, the quality of the read signal can be evaluated (i.e., the bit error rate of the read signal can be estimated).

It should be noted that in evaluating the signal quality by such a method, a combination of states, between which a state transition should have occurred along one of the two paths having the highest error probabilities (i.e., two paths having a minimum Euclidean distance between them), is preferably selected, and the signal quality may be evaluated by reference to the absolute value |Pa−Pb| of the difference between the probabilities of these two paths. Hereinafter, this point will be described in detail.

In decoding a read signal in accordance with the above-described state transition rule that requires the use of a minimum polarity inversion interval of two in combination with the PR (1, 2, 2, 1) equalization, not just the $S0_{k-5} \to S0_k$ state transition but also fifteen other state transitions may occur along two paths in the period between the times k−5 and k. The following Table 2 lists those sixteen state transitions (i.e., 16 combinations of states at the times k−5 and k) with their respective possible Pa−Pb (or Pstd) values:

TABLE 2

| State transition | Reliability Pa − Pb of decoded result | |
|---|---|---|
| | If Pa = 0 | If Pb = 0 |
| $S0_{k-5} \to S0_k$ | −36 | +36 |
| $S0_{k-5} \to S1_k$ | −36 | +36 |
| $S0_{k-4} \to S4_k$ | −10 | +10 |
| $S0_{k-4} \to S3_k$ | −10 | +10 |
| $S2_{k-4} \to S0_k$ | −10 | +10 |
| $S2_{k-4} \to S1_k$ | −10 | +10 |
| $S2_{k-5} \to S4_k$ | −36 | +36 |
| $S2_{k-5} \to S3_k$ | −36 | +36 |
| $S5_{k-5} \to S0_k$ | −36 | +36 |
| $S5_{k-5} \to S1_k$ | −36 | +36 |
| $S5_{k-4} \to S4_k$ | −10 | +10 |
| $S5_{k-4} \to S3_k$ | −10 | +10 |
| $S3_{k-4} \to S0_k$ | −10 | +10 |
| $S3_{k-4} \to S1_k$ | −10 | +10 |
| $S3_{k-5} \to S4_k$ | −36 | +36 |
| $S3_{k-5} \to S3_k$ | −36 | +36 |

The reliabilities Pa−Pb of the sixteen decoded results are given by the following Equations (8.1) through (8.16):

If $(c_{k-7}, c_{k-6}, c_{k-5}, c_{k-4}, c_{k-3}, c_{k-2}, c_{k-1}, c_k) = (0,0,0,x,x,0,0,0)$, then $Pa - Pb = (A_{k-4} - B_{k-4}) + (A_{k-3} - D_{k-3}) + (A_{k-2} - E_{k-2}) + (A_{k-1} - D_{k-1}) + (A_k - B_k);$ (8.1)

If $(c_{k-7}, c_{k-6}, c_{k-5}, c_{k-4}, c_{k-3}, c_{k-2}, c_{k-1}, c_k) = (0,0,0,x,x,0,0,0)$, then $Pa - Pb = (A_{k-4} - B_{k-4}) + (A_{k-3} - D_{k-3}) + (A_{k-2} - E_{k-2}) + (A_{k-1} - D_{k-1}) + (B_k - C_k);$ (8.2)

If $(c_{k-6}, c_{k-5}, c_{k-4}, c_{k-3}, c_{k-2}, c_{k-1}, c_k) = (0,0,0,x,1,1,0)$, then $Pa - Pb = (A_{k-3} - B_{k-3}) + (B_{k-2} - D_{k-2}) + (D_{k-1} - F_{k-1}) + (E_k - F_k);$ (8.3)

If $(c_{k-6}, c_{k-5}, c_{k-4}, c_{k-3}, c_{k-2}, c_{k-1}, c_k) = (0,0,0,x,1,1,1)$, then $Pa - Pb = (A_{k-3} - B_{k-3}) + (B_{k-2} - D_{k-2}) + (D_{k-1} - F_{k-1}) + (F_k - G_k);$ (8.4)

If $(c_{k-6}, c_{k-5}, c_{k-4}, c_{k-3}, c_{k-2}, c_{k-1}, c_k) = (0,1,1,x,0,0,0)$, then $Pa - Pb = (E_{k-3} - F_{k-3}) + (D_{k-2} - F_{k-2}) + (B_{k-1} - D_{k-1}) + (A_k - B_k);$ (8.5)

If $(c_{k-6}, c_{k-5}, c_{k-4}, c_{k-3}, c_{k-2}, c_{k-1}, c_k) = (0,1,1,x,0,0,1)$, then $Pa - Pb = (E_{k-3} - F_{k-3}) + (D_{k-2} - F_{k-2}) + (B_{k-1} - D_{k-1}) + (B_k - C_k);$ (8.6)

If $(c_{k-7}, c_{k-6}, c_{k-5}, c_{k-4}, c_{k-3}, c_{k-2}, c_{k-1}, c_k) = (0,1,1,x,x,1,1,0)$, then $Pa - Pb = (E_{k-4} - F_{k-4}) + (D_{k-3} - G_{k-3}) + (C_{k-2} - G_{k-2}) + (D_{k-1} - G_{k-1}) + (E_k - F_k);$ (8.7)

If $(c_{k-7}, c_{k-6}, c_{k-5}, c_{k-4}, c_{k-3}, c_{k-2}, c_{k-1}, c_k) = (0,1,1,x,x,1,1,1)$, then $Pa - Pb = (E_{k-4} - F_{k-4}) + (D_{k-3} - G_{k-3}) + (C_{k-2} - G_{k-2}) + (D_{k-1} - G_{k-1}) + (F_k - G_k);$ (8.8)

If $(c_{k-7}, c_{k-6}, c_{k-5}, c_{k-4}, c_{k-3}, c_{k-2}, c_{k-1}, c_k) = (1,0,0,x,x,0,0,0)$, then $Pa - Pb = (B_{k-4} - C_{k-4}) + (A_{k-3} - D_{k-3}) + (A_{k-2} - E_{k-2}) + (A_{k-1} - D_{k-1}) + (A_k - B_k);$ (8.9)

If $(c_{k-7}, c_{k-6}, c_{k-5}, c_{k-4}, c_{k-3}, c_{k-2}, c_{k-1}, c_k) = (1,0,0,x,x,0,0,1)$, then $Pa - Pb = (B_{k-4} - C_{k-4}) + (A_{k-3} - D_{k-3}) + (A_{k-2} - E_{k-2}) + (A_{k-1} - D_{k-1}) + (B_k - C_k);$ (8.10)

If $(c_{k-6}, c_{k-5}, c_{k-4}, c_{k-3}, c_{k-2}, c_{k-1}, c_k) = (1,0,0,x,1,1,0)$, then $Pa - Pb = (B_{k-3} - C_{k-3}) + (B_{k-2} - D_{k-2}) + (D_{k-1} - F_{k-1}) + (E_k - F_k);$ (8.11)

If $(c_{k-6}, c_{k-5}, c_{k-4}, c_{k-3}, c_{k-2}, c_{k-1}, c_k) = (1,0,0,x,1,1,1)$, then $Pa - Pb = (B_{k-3} - C_{k-3}) + (B_{k-2} - D_{k-2}) + (D_{k-1} - F_{k-1}) + (F_k - G_k);$ (8.12)

If $(c_{k-6}, c_{k-5}, c_{k-4}, c_{k-3}, c_{k-2}, c_{k-1}, c_k) = (1,1,1,x,0,0,0)$, then $Pa - Pb = (F_{k-3} - G_{k-3}) + (D_{k-2} - F_{k-2}) + (B_{k-1} - D_{k-1}) + (A_k - B_k);$ (8.13)

If $(c_{k-6}, c_{k-5}, c_{k-4}, c_{k-3}, c_{k-2}, c_{k-1}, c_k) = (1,1,1,x,0,0,0)$,
then $Pa-Pb=(F_{k-3}-G_{k-3})+(D_{k-2}-F_{k-2})+(B_{k-1}-D_{k-1})+(B_k-C_k)$; (8.14)

If $(c_{k-7}, c_{k-6}, c_{k-5}, c_{k-4}, c_{k-3}, c_{k-2}, c_{k-1}, c_k) = (1,1,1,x,x,1,1,0)$, then $Pa-Pb=(F_{k-4}-G_{k-4})+(D_{k-3}-G_{k-3})+(C_{k-2}-G_{k-2})+(D_{k-1}-G_{k-1})+(E_k-F_k)$; and (8.15)

If $(c_{k-7}, c_{k-6}, c_{k-5}, c_{k-4}, c_{k-3}, c_{k-2}, c_{k-1}, c_k) = (1,1,1,x,x,1,1,1)$, then $Pa-Pb=(F_{k-4}-G_{k-4})+(D_{k-3}-G_{k-3})+(C_{k-2}-G_{k-2})+(D_{k-1}-G_{k-1})+(F_k-G_k)$. (8.16)

where $A_k=(y_k-0)^2$, $B_k=(y_k-1)^2$, $C_k=(y_k-2)^2$, $D_k=(y_k-3)^2$, $E_k=(y_k-4)^2$, $F_k=(y_k-5)^2$ and $G_k=(y_k-6)^2$.

These Equations (8.1) through (8.16) may be classified by the Pstd value into the following two group of Equations (9.1) through (9.8) (where Pstd=10) and (10.1) through (10.8) (where Pstd=36):

If $(c_{k-6}, c_{k-5}, c_{k-4}, c_{k-3}, c_{k-2}, c_{k-1}, c_k) = (0,0,0,x,1,1,0)$,
then $Pa-Pb=(A_{k-3}-B_{k-3})+(B_{k-2}-D_{k-2})+(D_{k-1}-F_{k-1})+(E_k-F_k)$; (9.1)

If $(c_{k-6}, c_{k-5}, c_{k-4}, c_{k-3}, c_{k-2}, c_{k-1}, c_k) = (0,0,0,x,1,1,1)$,
then $Pa-Pb=(A_{k-3}-B_{k-3})+(B_{k-2}-D_{k-2})+(D_{k-1}-F_{k-1})+(F_k-G_k)$; (9.2)

If $(c_{k-6}, c_{k-5}, c_{k-4}, c_{k-3}, c_{k-2}, c_{k-1}, c_k) = (0,1,1,x,0,0,0)$,
then $Pa-Pb=(E_{k-3}-F_{k-3})+(D_{k-2}-F_{k-2})+(B_{k-1}-D_{k-1})+(A_k-B_k)$; (9.3)

If $(c_{k-6}, c_{k-5}, c_{k-4}, c_{k-3}, c_{k-2}, c_{k-1}, c_k) = (0,1,1,x,0,0,1)$,
then $Pa-Pb=(E_{k-3}-F_{k-3})+(D_{k-2}-F_{k-2})+(B_{k-1}-D_{k-1})+(B_k-C_k)$; (9.4)

If $(c_{k-6}, c_{k-5}, c_{k-4}, c_{k-3}, c_{k-2}, c_{k-1}, c_k) = (1,0,0,x,1,1,0)$,
then $Pa-Pb=(B_{k-3}-C_{k-3})+(B_{k-2}-D_{k-2})+(D_{k-1}-F_{k-1})+(E_k-F_k)$; (9.5)

If $(c_{k-6}, c_{k-5}, c_{k-4}, c_{k-3}, c_{k-2}, c_{k-1}, c_k) = (1,0,0,x,1,1,1)$,
then $Pa-Pb=(B_{k-3}-C_{k-3})+(B_{k-2}-D_{k-2})+(D_{k-1}-F_{k-1})+(F_k-G_k)$; (9.6)

If $(c_{k-6}, c_{k-5}, c_{k-4}, c_{k-3}, c_{k-2}, c_{k-1}, c_k) = (1,1,1,x,0,0,0)$,
then $Pa-Pb=(F_{k-3}-G_{k-3})+(D_{k-2}-F_{k-2})+(B_{k-1}-D_{k-1})+(A_k-B_k)$; and (9.7)

If $(c_{k-6}, c_{k-5}, c_{k-4}, c_{k-3}, c_{k-2}, c_{k-1}, c_k) = (1,1,1,x,0,0,1)$,
then $Pa-Pb=(F_{k-3}-G_{k-3})+(D_{k-2}-F_{k-2})+(B_{k-1}-D_{k-1})+(B_k-C_k)$; (9.8)

If $(c_{k-7}, c_{k-6}, c_{k-5}, c_{k-4}, c_{k-3}, c_{k-2}, c_{k-1}, c_k) = (0,0,0,x,x,0,0,0)$,
then $Pa-Pb=(A_{k-4}-B_{k-4})+(A_{k-3}-D_{k-3})+(A_{k-2}-E_{k-2})+(A_{k-1}-D_{k-1})+(A_k-B_k)$; (10.1)

If $(c_{k-7}, c_{k-6}, c_{k-5}, c_{k-4}, c_{k-3}, c_{k-2}, c_{k-1}, c_k) = (0,0,0,x,x,0,0,1)$,
then $Pa-Pb=(A_{k-4}-B_{k-4})+(A_{k-3}-D_{k-3})+(A_{k-2}-E_{k-2})+(A_{k-1}-D_{k-1})+(B_k-C_k)$; (10.2)

If $(c_{k-7}, c_{k-6}, c_{k-5}, c_{k-4}, c_{k-3}, c_{k-2}, c_{k-1}, c_k) = (0,1,1,x,x,1,1,0)$,
then $Pa-Pb=(E_{k-4}-F_{k-4})+(D_{k-3}-G_{k-3})+(C_{k-2}-G_{k-2})+(D_{k-1}-G_{k-1})+(E_k-F_k)$; (10.3)

If $(c_{k-7}, c_{k-6}, c_{k-5}, c_{k-4}, c_{k-3}, c_{k-2}, c_{k-1}, c_k) = (0,1,1,x,x,1,1,1)$,
then $Pa-Pb=(E_{k-4}-F_{k-4})+(D_{k-3}-G_{k-3})+(C_{k-2}-G_{k-2})+(D_{k-1}-G_{k-1})+(F_k-G_k)$; (10.4)

If $(c_{k-7}, c_{k-6}, c_{k-5}, c_{k-4}, c_{k-3}, c_{k-2}, c_{k-1}, c_k) = (1,0,0,x,x,0,0,0)$,
then $Pa-Pb=(B_{k-4}-C_{k-4})+(A_{k-3}-D_{k-3})+(A_{k-2}-E_{k-2})+(A_{k-1}-D_{k-1})+(A_k-B_k)$; (10.5)

If $(c_{k-7}, c_{k-6}, c_{k-5}, c_{k-4}, c_{k-3}, c_{k-2}, c_{k-1}, c_k) = (1,0,0,x,x,0,0,1)$,
then $Pa-Pb=(B_{k-4}-C_{k-4})+(A_{k-3}-D_{k-3})+(A_{k-2}-E_{k-2})+(A_{k-1}-D_{k-1})+(B_k-C_k)$; (10.6)

If $(c_{k-7}, c_{k-6}, c_{k-5}, c_{k-4}, c_{k-3}, c_{k-2}, c_{k-1}, c_k) = (1,1,1,x,x,1,1,0)$, then $Pa-Pb=(F_{k-4}-G_{k-4})+(D_{k-3}-G_{k-3})+(C_{k-2}-G_{k-2})+(D_{k-1}-G_{k-1})+(E_k-F_k)$; and (10.7)

If $(c_{k-7}, c_{k-6}, c_{k-5}, c_{k-4}, c_{k-3}, c_{k-2}, c_{k-1}, c_k) = (1,1,1,x,x,1,1,1)$, then $Pa-Pb=(F_{k-4}-G_{k-4})+(D_{k-3}-G_{k-3})+(C_{k-2}-G_{k-2})+(D_{k-1}-G_{k-1})+(F_k-G_k)$ (10.8)

Hereinafter, it will be described how to obtain error rate indices to each of these possible state transitions. As for the eight state transitions having a Pstd value of 10, Pa−Pb values satisfying Equations (9.1) through (9.8) are obtained from the most likely decoded results $c_k$ and the standard deviation $\sigma_{10}$ and average $Pave_{10}$ are obtained from their distribution. As for the other eight state transitions having a Pstd value of 36 on the other hand, Pa−Pb values satisfying Equations (10.1) through (10.8) are obtained from the most likely decoded results $c_k$ and the standard deviation $\sigma_{36}$ and average $Pave_{36}$ are obtained from their distribution. Supposing these distributions are both normal distributions, the error probabilities $P_{10}$ and $P_{36}$ are respectively given by the following Equations (11) and (12):

$$P_{10}(\sigma_{10}, Pave_{10}) = \mathrm{erfc}\left(\frac{10 + Pave_{10}}{\sigma_{10}}\right) \quad (11)$$

$$P_{36}(\sigma_{36}, Pave_{36}) = \mathrm{erfc}\left(\frac{36 + Pave_{36}}{\sigma_{36}}\right) \quad (12)$$

That is to say, the error rate can be estimated for each pattern of the most likely decoded results. Thus, the standard deviation $\sigma_{10}$ and average $Pave_{10}$ or the standard deviation $\sigma_{36}$ and average $Pave_{36}$ may be used as indices to the quality of the read signal.

If the state transition pattern detection range is expanded by one time period (i.e., when combination patterns of state transitions, each of which should have occurred along one of two paths, are detected in the period between the time k−6 and the time k), the eight patterns shown in the following Table 3 may be further detected:

TABLE 3

| State transition | Reliability Pa − Pb of decoded result | |
|---|---|---|
| | If Pa = 0 | If Pb = 0 |
| $S0_{k-6} \to S0_k$ | −12 | +12 |
| $S0_{k-6} \to S1_k$ | −12 | +12 |
| $S2_{k-6} \to S3_k$ | −12 | +12 |
| $S2_{k-6} \to S4_k$ | −12 | +12 |
| $S5_{k-6} \to S0_k$ | −12 | +12 |
| $S5_{k-6} \to S1_k$ | −12 | +12 |
| $S3_{k-6} \to S3_k$ | −12 | +12 |
| $S3_{k-6} \to S4_k$ | −12 | +12 |

Just like the Equations (11) and (12), the error probability $P_{12}$ of each of the eight patterns shown in Table 3 is given by the following Equation (13):

$$P_{12}(\sigma_{12}, Pave_{12}) = \mathrm{erfc}\left(\frac{12 + Pave_{12}}{\sigma_{12}}\right) \quad (13)$$

The point is that the reliability |Pa−Pb| may be used effectively as an index to the quality of the read signal by detecting only state transition patterns having relatively high error probabilities (or error rates). That is to say, an index correlated with the error rate can be obtained without detecting all state transition patterns.

As used herein, the "state transition patterns having relatively high error probabilities" refer to state transition patterns of which the maximum value of the reliability values Pa−Pb| is relatively small (i.e., patterns having the smallest Euclidean distance, or the absolute distance between the paths A and B). In this example, the "state transition patterns having relatively high error probabilities" are the eight patterns shown in Table 2 in which Pa−Pb=±10 when Pa=0 or Pb=0.

If white noise prevails in the noise included in the read signal, it is expected that an inequality $P_{10} > P_{12} \gg P_{36}$ is satisfied. Among these three error probabilities, only $P_{10}$ means a shift error of one bit, while the other two $P_{12}$ and $P_{36}$ mean a shift error of two or more bits. Generally speaking, almost all error patterns are found to be one-bit shift errors after PRML processing has been performed. Accordingly, the error rate of the read signal may be appropriately estimated by Equation (11) that defines the error probability $P_{10}$. In this manner, the quality of the read signal may be evaluated by detecting patterns representing predetermined state transitions in a predetermined period and by using, as indices, the standard deviation $\sigma_{10}$, and average $Pave_{10}$ of the |Pa−Pb|−Pstd distribution of the state transition patterns detected.

As described above, the error rate may be estimated by using the standard deviation $\sigma_{10}$. Alternatively, a maximum likelihood sequence amplitude (MLSA), which is an error index for use in PRML processing (which will be herein simply referred to as an "MLSA index"), may also be used as an index to the signal quality (or error rate). The MLSA index is defined by the following Equation (14):

$$M = \frac{\sigma_{10}}{2 \cdot d_{min}^2} [\%] \quad (14)$$

where $d^2_{min}$ is the square of the minimum Euclidean distance between two possible paths. In the combination of modulation code and PRML method as adopted in this preferred embodiment, $d^2_{min}=10$. This MLSA index is obtained by Equation (14) on the supposition that the average $Pave_{10}$ used in Equation (11) is zero (i.e., while leaving the average $Pave_{10}$ out of consideration). This is because the average $Pave_{10}$ is typically approximately zero and normally does not constitute a major factor of decreasing the correlation between the index and the error rate.

Figure 2:
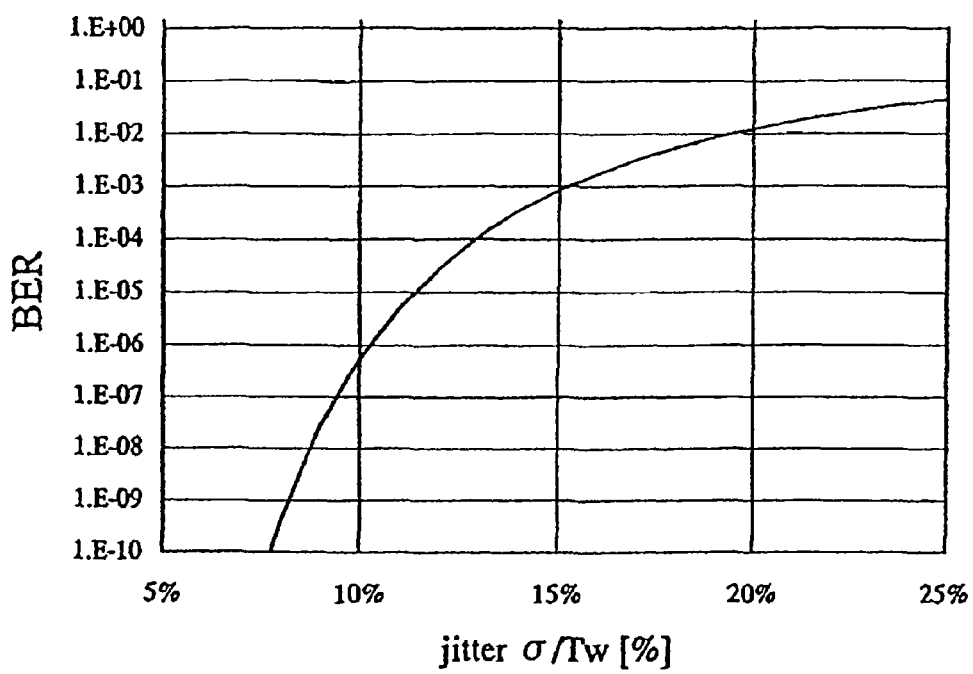
FIG. 2 is a graph showing a relationship between the jitter and the bit error rate (BER).
Figure 16:
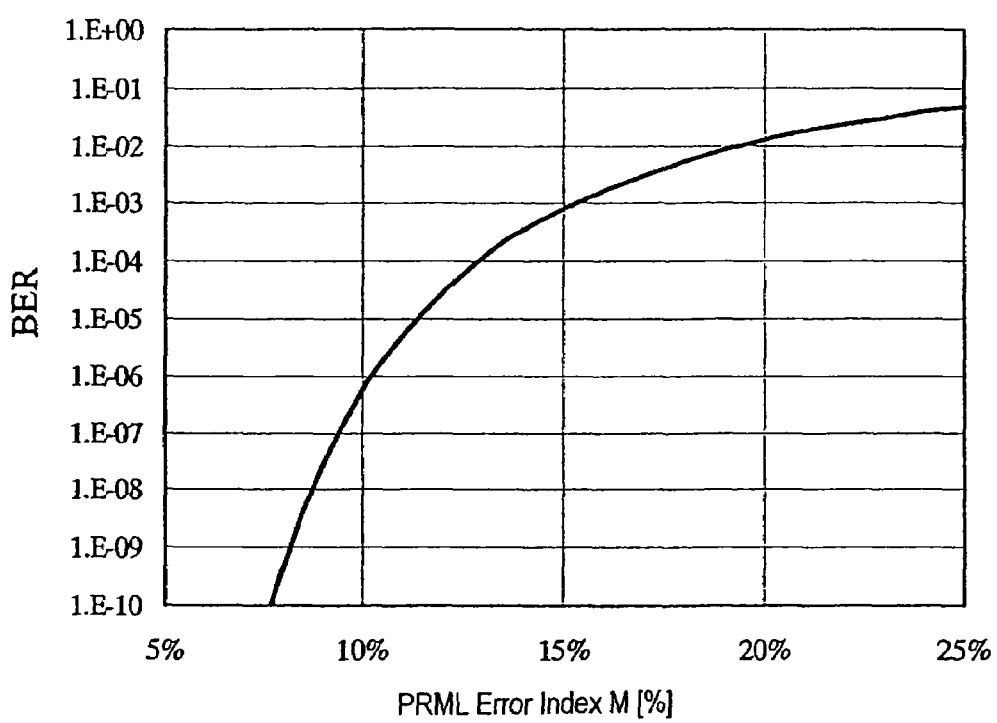
FIG. 16 is a graph showing a relationship between the PRML error index MLSA and the bit error rate (BER).

FIG. 16 shows a relationship between the MLSA index as defined by Equation (14) and a bit error rate BER as derived by Equation (11). It can be seen that just like the jitter-error rate relationship shown in FIG. 2, as the MLSA index increases, the error rate increases. That is to say, it can be seen that the error rate to be obtained after the PRML processing may be estimated by using the MLSA index.

In the specific preferred embodiment described above, a PR (1, 2, 2, 1) equalization technique is used as an exemplary PR (C0, C1, C1, C0) equalization technique (where C0 and C1 are arbitrary positive integers). However, even if any other PR (C0, C1, C1, C0) equalization technique (where C0 and C1 are arbitrary positive integers) is adopted, an index correlated with the error rate can also be obtained through a similar procedure.

Hereinafter, another specific preferred embodiment of the present invention will be described. In the following specific preferred embodiment, a recorded code having a minimum polarity inversion interval of two is used as in the preferred embodiment described above. However, unlike the preferred embodiment described above, a PR (C0, C1, C0) (where C0 and C1 are arbitrary positive integers) equalization technique (e.g., PR (1, 2, 1) equalization) is applied to the following preferred embodiment.

Suppose recorded codes (each being made up of zeros or ones) are denoted by:
Current recorded code: $b_k$;
Recording code at the previous time: $b_{k-1}$; and
Recording code at the second last time: $b_{k-2}$ An ideal value $Level_v$ of a read signal that has been subjected to the PR (C0, C1, C0) equalization is given by the following Equation (15):

$$Level_v = C0 \times b_{k-2} + C1 \times b_{k-1} + C0 \times b_k \quad (15)$$

where k is an integer representing a time and v is an integer of 0 to 3. Supposing a state at a time k is identified by S ($b_{k-1}$, $b_k$), a table of state transitions such as the following Table 4 is obtained:

TABLE 4

| State S ($b_{k-2}$, $b_{k-1}$) at time k − 1 | State S ($b_{k-1}$, $b_k$) at time k | $b_k$/LEVEL$_v$ |
|---|---|---|
| S (0, 0) | S (0, 0) | 0/0 |
| S (0, 0) | S (0, 1) | 1/C0 |
| S (0, 1) | S (1, 1) | 1/C0 + C1 |
| S (1, 1) | S (1, 0) | 0/C1 + C0 |
| S (1, 1) | S (1, 1) | 1/C0 + C1 + C0 |
| S (1, 0) | S (0, 0) | 0/C0 |

Figure 17:
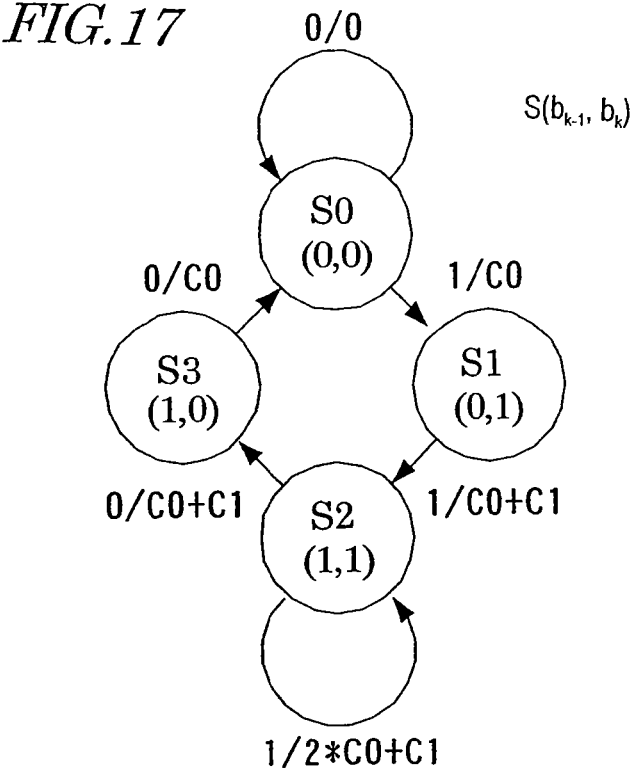
FIG. 17 is a state transition diagram that is defined by the constraints, including a minimum polarity inversion interval of two and the use of a PR (C0, C1, C0) equalization technique, according to another preferred embodiment of the present invention.
Figure 18:
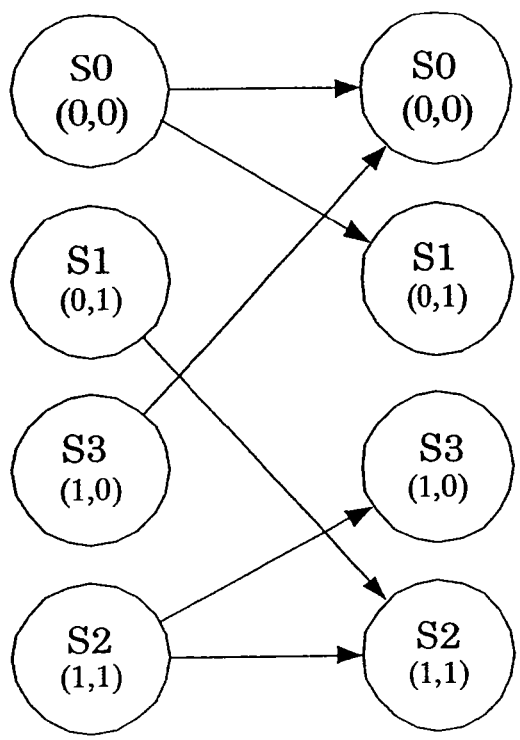
FIG. 18 is a trellis diagram that is defined by the constraints, including the minimum polarity inversion interval of two and the use of the PR (C0, C1, C0) equalization technique, in the preferred embodiment of the present invention.

In the following description, the states S $(0, 0)_k$, S $(0, 1)_k$, S $(1, 1)_k$, S $(1, 0)_k$ and so on at the time k will be identified by $S0_k$, $S1_k$, $S2_k$, $S3_k$ and so on, respectively, for the sake of simplicity. The state transitions that may occur in the period between the time k−1 and the time k (i.e., a period of time corresponding to one cycle T of a read clock signal) are represented by the state transition diagram shown in FIG. 17. When the state transition diagram shown in FIG. 17 is expanded with respect to the time axis, the trellis diagram shown in FIG. 18 is obtained.

In this preferred embodiment, each recorded code has a minimum polarity inversion interval of two and the PR (C0, C1, C0) equalization technique is used. Under these conditions, there are six possible state transition patterns (i.e., possible combinations of states) as for state transitions occurring from a predetermined state at a time into another predetermined state at a different time along two paths (i.e., paths A and B) as shown in the following Table 5:

TABLE 5

| State transition | Recording code ($b_{k-i}$, ..., $b_k$) of path A | Recording code ($b_{k-i}$, ..., $b_k$) of path B |
|---|---|---|
| $S0_{k-3} \rightarrow S2_k$ | (0, 0, 0, 1, 1) | (0, 0, 1, 1, 1) |
| $S2_{k-3} \rightarrow S0_k$ | (1, 1, 0, 0, 0) | (1, 1, 1, 0, 0) |
| $S0_{k-4} \rightarrow S0_k$ | (0, 0, 0, 0, 0) | (0, 0, 1, 1, 0, 0) |
| $S2_{k-4} \rightarrow S2_k$ | (1, 1, 0, 0, 1, 1) | (1, 1, 1, 1, 1, 1) |
| $S0_{k-5} \rightarrow S0_k$ | (0, 0, 0, 1, 1, 0, 0) | (0, 0, 1, 1, 0, 0, 0) |
| $S2_{k-5} \rightarrow S2_k$ | (1, 1, 0, 0, 0, 1, 1) | (1, 1, 1, 0, 0, 1, 1) |

In this case, it is determined which of the two paths A and B has the higher probability. This decision can be made by comparing the sum of errors between ideal sample values (i.e., expected values) shown by the path A and actual sample values with the sum of errors between associated ideal sample values (i.e., expected values) shown by the path B and the actual sample values.

For example, suppose the state transition $S0_{k-3} \to S2_k$ should be estimated. As for this state transition, no matter whether the path A ($S0_{k-3}$, $S0_{k-2}$, $S1_{k-1}$, $S2_k$) or the path B ($S0_{k-3}$, $S1_{k-2}$, $S2_{k-1}$, $S2_k$) has been taken, the state at the time k−3 is $S0_{k-3}$ and the state at the time k is $S2_k$. In this case, it is by using the sum of squared errors between the expected values and the actual values $y_{k-2}$, $y_{k-1}$, and $y_k$ of the read signal in the period between the times k−2 and k that it is determined which of the two paths A and B has the higher probability. As in the preferred embodiment described above, the sum of squared errors between the expected values shown by the path A and the actual values $y_{k-2}$, $y_{k-1}$ and $y_k$ of the read signal in the period between the times k−2 and k is identified by Pa. On the other hand, the sum of squared errors between the expected values shown by the path B and the actual values $y_{k-2}$, $y_{k-1}$, and $y_k$ of the read signal in the period between the times k−2 and k is identified by Pb. These sums of squared errors Pa and Pb (i.e., the error probabilities) are respectively given by the following Equations (16) and (17):

$$Pa=(y_{k-2}-0)^2+(y_{k-1}C0)^2+(y_k-(C0+C1))^2 \tag{16}$$

$$Pb=(y_{k-2}-C0)^2+(y_{k-1}-(C0+C1))^2+(y_k-(2\times C0+C1))^2 \tag{17}$$

In this case, if Pa<<Pb, then the path A is estimated to be the more probable one. On the other hand, if Pa>>Pb, then the path B is estimated to be the more probable one. That is to say, even when a recorded code having a minimum polarity inversion interval of two is combined with the PR (C0, C1, C0) equalization technique, the reliability of the decoded result can also be evaluated by |Pa−Pb|. Also, the quality of the read signal can be evaluated (or the error rate can be estimated) based on the |Pa−Pb| distribution.

Furthermore, suppose white noise has been superposed on the transmission line. In that case, a state transition having the highest error probability should have a minimum Euclidean distance between the paths A and B. The two state transition patterns shown in the following Table 6 should have the minimum Euclidean distance between their two paths:

TABLE 6

| State transition | Recording code ($b_{k-4}, b_{k-3}, b_{k-2}, b_{k-1}, b_k$) of path A | Recording code ($b_{k-4}, b_{k-3}, b_{k-2}, b_{k-1}, b_k$) of path B |
|---|---|---|
| $S0_{k-3} \to S2_k$ | (0, 0, 0, 1, 1) | (0, 0, 1, 1, 1) |
| $S2_{k-3} \to S0_k$ | (1, 1, 0, 0, 0) | (1, 1, 1, 0, 0) |

The reliabilities Pa−Pb of the two state transition patterns shown in Table 6 are given by the following Equations (18.1) and (18.2):

If $(c_{k-4}, c_{k-3}, c_{k-2}, c_{k-1}, c_k) = (0,0,x,1,1)$, then $Pa-Pb =$
$(AA_{k-2}-BB_{k-2})+(BB_{k-1}-CC_{k-1})+(CC_k-DD_k)$;
and (18.1)

If $(c_{k-4}, c_{k-3}, c_{k-2}, c_{k-1}, c_k) = (1,1,x,0,0)$, then $Pa-Pb =$
$(CC_{k-2}-DD_{k-2})+(BB_{k-1}-CC_{k-1})+(AA_k-BB_k)$ (18.1)

where $c_k$ is the decoded result, k is an integer, and $AA_k$, $BB_k$, $CC_k$ and $DD_k$ are given by:
$AA_k=(y_k-0)^2$,
$BB_k=(y_k-C0)^2$,
$CC_k=(y_k-(C0+C1))^2$ and
$DD_k=(y_k-(2\times C0+C1))^2$ $|Pa-Pb|-(2\times C0^2+C1^2)$ that satisfies Equations (18.1) and (18.2) is derived from the decoded result $c_k$ and the standard deviation σ and average Pave are obtained from its distribution. Supposing that distribution is a normal distribution, the error probability is given by the following Equation (19):

$$P(\sigma, Pave) = \text{erfc}\left(\frac{Pave}{\sigma}\right) \tag{19}$$

Thus, the standard deviation σ and average Pave may be used to estimate the error rate of the read signal or evaluate the quality of the read signal.

As described above, even when a recorded code having a minimum polarity inversion interval of two is used in combination with the PR (C0, C1, C0) equalization, the quality of the read signal can also be evaluated by the difference in probability |Pa−Pb| between the two paths of state transitions occurring in a predetermined period.

Hereinafter, another specific preferred embodiment of the present invention will be described. In the following specific preferred embodiment, a recorded code having a minimum polarity inversion interval of two is used as in the preferred embodiments described above. However, unlike the preferred embodiments described above, a PR (C0, C1, C2, C1, C0) (where C0, C1 and C2 are arbitrary positive integers) equalization technique is applied to the following preferred embodiment.

Suppose recorded codes are denoted by:
Current recorded code: $b_k$;
Recording code at the previous time: $b_{k-1}$;
Recording code at the second last time: $b_{k-2}$;
Recording code at the third last time: $b_{k-3}$; and
Recording code at the fourth last time: $b_{k-4}$ An ideal value $Level_v$ of a read signal that has been subjected to the PR (C0, C1, C2, C1, C0) equalization is given by the following Equation (20):

$$Level_v = C0 \times b_{k-4} + C1 \times b_{k-3} + C2 \times b_{k-2} + C1 \times b_{k-1} + C0 \times b_k \tag{20}$$

where k is an integer representing a time and v is an integer of 0 to 8. Supposing a state at a time k is identified by S ($b_{k-3}$, $b_{k-2}$, $b_{k-1}$, $b_k$), a table of state transitions such as the following Table 7 is obtained:

TABLE 7

| State S ($b_{k-4}, b_{k-3}, b_{k-2}, b_{k-1}$) at time k − 1 | State S ($b_{k-3}, b_{k-2}, b_{k-1}, b_k$) at time k | $b_k$/$LEVEL_v$ |
|---|---|---|
| S (0, 0, 0, 0) | S (0, 0, 0, 0) | 0/0 |
| S (0, 0, 0, 0) | S (0, 0, 0, 1) | 1/C0 |
| S (0, 0, 0, 1) | S (0, 0, 1, 1) | 1/C0 + C1 |
| S (0, 0, 1, 1) | S (0, 1, 1, 0) | 0/C1 + C2 |
| S (0, 0, 1, 1) | S (0, 1, 1, 1) | 1/C0 + C1 + C2 |
| S (0, 1, 1, 0) | S (1, 1, 0, 0) | 0/C1 + C2 |
| S (0, 1, 1, 1) | S (1, 1, 1, 0) | 0/2 * C1 + C2 |
| S (0, 1, 1, 1) | S (1, 1, 1, 1) | 1/C0 + 2 * C1 + C2 |
| S (1, 0, 0, 0) | S (0, 0, 0, 0) | 0/C0 |
| S (1, 0, 0, 0) | S (0, 0, 0, 1) | 1/2 * C0 |
| S (1, 0, 0, 1) | S (0, 0, 1, 1) | 1/2 * C0 + C1 |
| S (1, 1, 0, 0) | S (1, 0, 0, 0) | 0/C0 + C1 |
| S (1, 1, 0, 0) | S (1, 0, 0, 1) | 1/2 * C0 + C1 |
| S (1, 1, 1, 0) | S (1, 1, 0, 0) | 0/C0 + C1 + C2 |
| S (1, 1, 1, 1) | S (1, 1, 1, 0) | 0/C0 + 2 * C1 + C2 |
| S (1, 1, 1, 1) | S (1, 1, 1, 1) | 1/2 * C0 + 2 * C1 + C2 |

Figure 19:
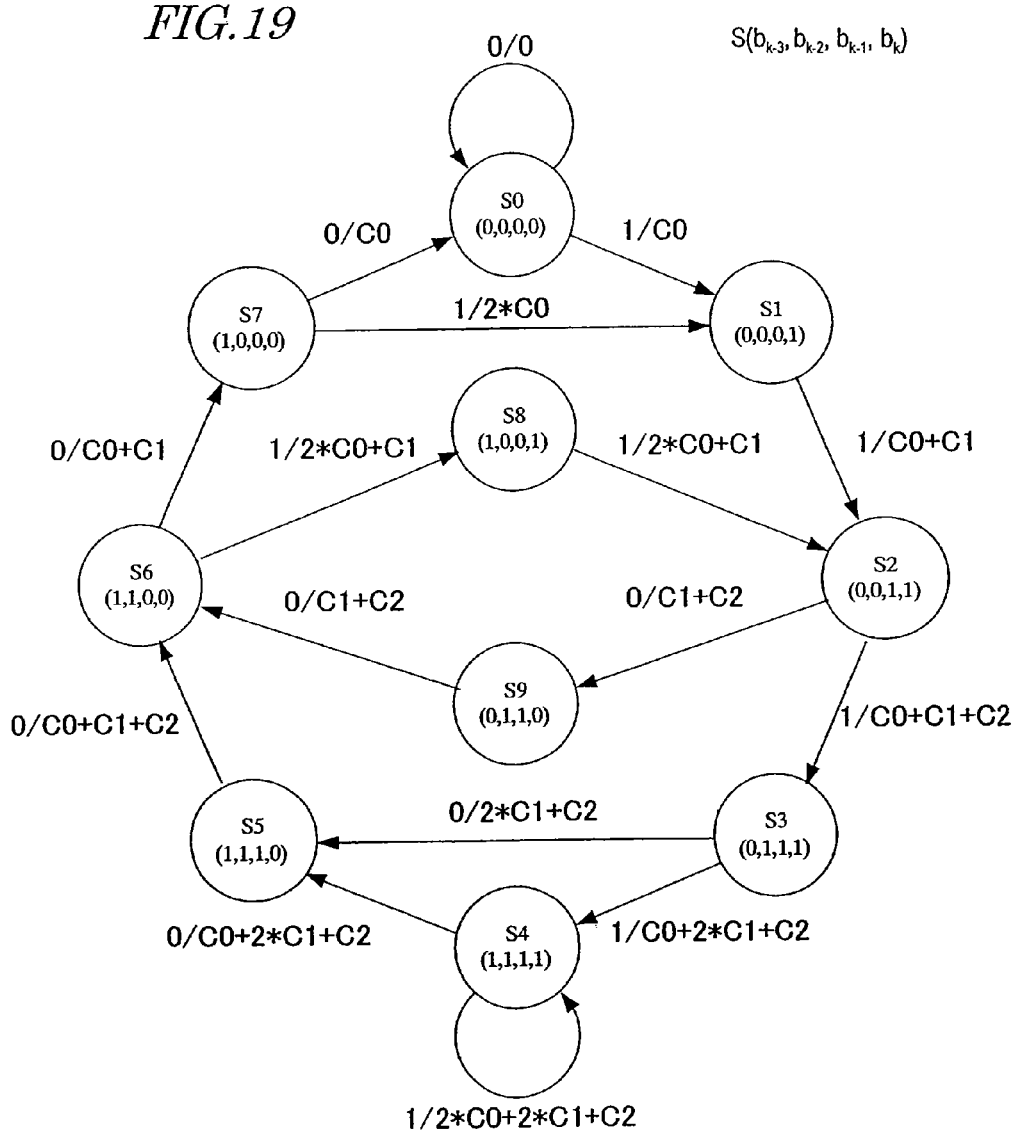
FIG. 19 is a state transition diagram that is defined by the constraints, including a minimum polarity inversion interval of two and the use of a PR (C0, C1, C2, C1, C0) equalization technique, according to another preferred embodiment of the present invention.
Figure 20:
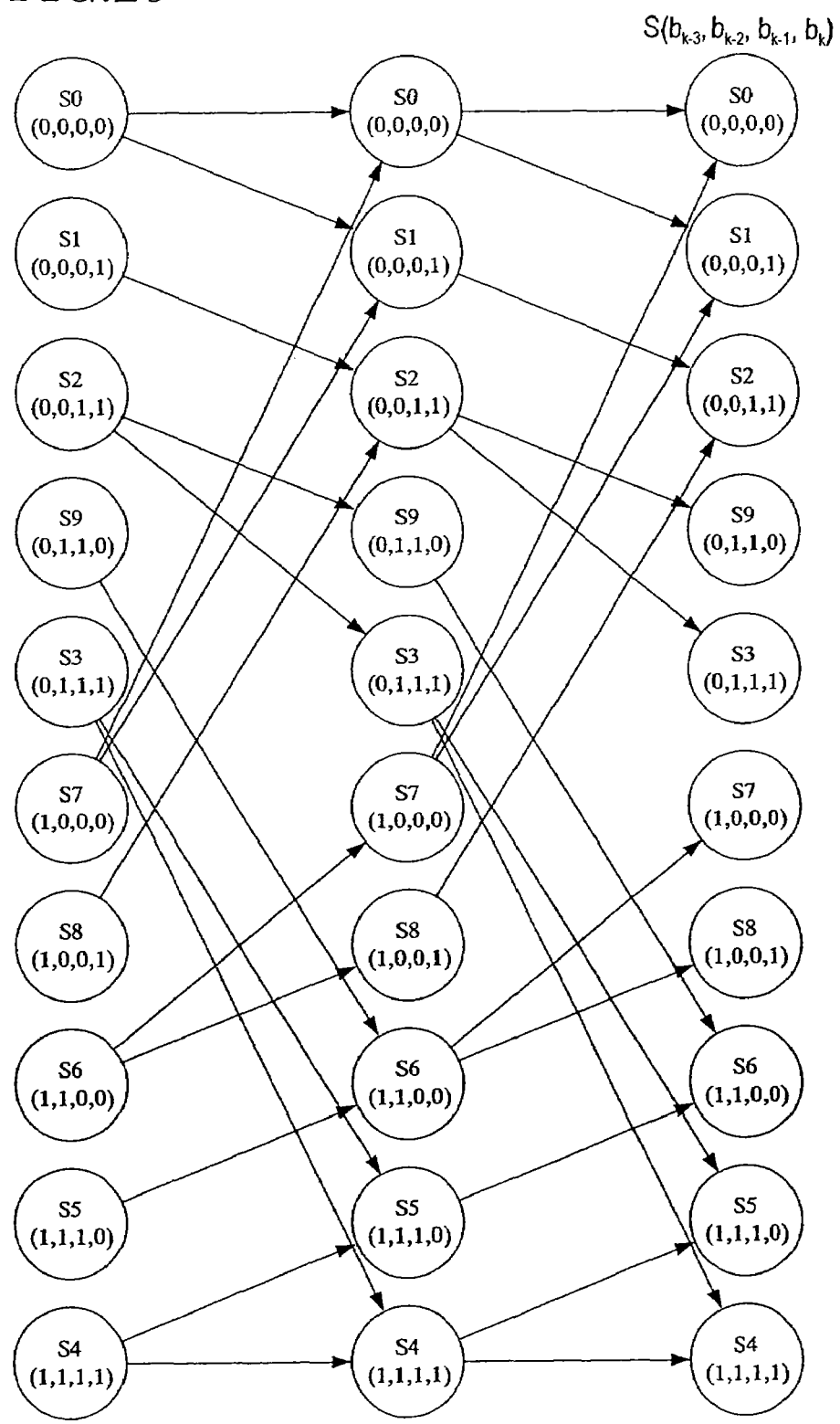
FIG. 20 is a trellis diagram that is defined by the constraints, including the minimum polarity inversion interval of two and the use of the PR (C0, C1, C2, C1, C0) equalization technique, in the preferred embodiment of the present invention.

In the following description, the states S $(0, 0, 0, 0)_k$, S $(0, 0, 0, 1)_k$, S $(0, 0, 1, 1)_k$, S $(0, 1, 1, 1)_k$, S $(1, 1, 1, 1)_k$, S $(1, 1, 1, 0)_k$, S $(1, 1, 0, 0)_k$, S $(1, 0, 0, 0)_k$, S $(1, 0, 0, 1)_k$, S $(0, 1, 1,$ $0)_k$ and so on at the time k will be identified by $S0_k$, $S1_k$, $S2_k$, $S3_k$, $S4_k$, $S5_k$, $S6_k$, $S7_k$, $S8_k$, $S9_k$ and so on, respectively, for the sake of simplicity. The state transitions that may occur in the period between the time k−1 and the time k (i.e., a period of time corresponding to one cycle T of a read clock signal) are represented by the state transition diagram shown in FIG. 19. When the state transition diagram shown in FIG. 19 is expanded with respect to the time axis, the trellis diagram shown in FIG. 20 is obtained.

In this preferred embodiment, each recorded code has a minimum polarity inversion interval of two and the PR (C0, C1, C2, C1, C0) equalization technique is used. Under these conditions, there are 90 possible state transition patterns (i.e., possible combinations of states) for state transitions occurring from a predetermined state at a time into another predetermined state at a different time along two paths (i.e., paths A and B) as shown in the following Table 8:

TABLE 8

| State transition | Recording code $(b_{k-i}, \ldots, b_k)$ of path A | Recording code $(b_{k-i}, \ldots, b_k)$ of path B |
| --- | --- | --- |
| $S0_{k-5} \to S6_k$ | (0, 0, 0, 0, 0, 1, 1, 0, 0) | (0, 0, 0, 0, 1, 1, 1, 0, 0) |
| $S0_{k-5} \to S5_k$ | (0, 0, 0, 0, 0, 1, 1, 1, 0) | (0, 0, 0, 0, 1, 1, 1, 1, 0) |
| $S0_{k-5} \to S4_k$ | (0, 0, 0, 0, 0, 1, 1, 1, 1) | (0, 0, 0, 0, 1, 1, 1, 1, 1) |
| $S2_{k-5} \to S0_k$ | (0, 0, 1, 1, 0, 0, 0, 0, 0) | (0, 0, 1, 1, 1, 0, 0, 0, 0) |
| $S2_{k-5} \to S1_k$ | (0, 0, 1, 1, 0, 0, 0, 0, 1) | (0, 0, 1, 1, 1, 0, 0, 0, 1) |
| $S2_{k-5} \to S2_k$ | (0, 0, 1, 1, 0, 0, 0, 1, 1) | (0, 0, 1, 1, 1, 0, 0, 1, 1) |
| $S3_{k-5} \to S0_k$ | (0, 1, 1, 1, 0, 0, 0, 0, 0) | (0, 1, 1, 1, 1, 0, 0, 0, 0) |
| $S3_{k-5} \to S1_k$ | (0, 1, 1, 1, 0, 0, 0, 0, 1) | (0, 1, 1, 1, 1, 0, 0, 0, 1) |
| $S3_{k-5} \to S2_k$ | (0, 1, 1, 1, 0, 0, 0, 1, 1) | (0, 1, 1, 1, 1, 0, 0, 1, 1) |
| $S7_{k-5} \to S6_k$ | (1, 0, 0, 0, 0, 1, 1, 0, 0) | (1, 0, 0, 0, 1, 1, 1, 0, 0) |
| $S7_{k-5} \to S5_k$ | (1, 0, 0, 0, 0, 1, 1, 1, 0) | (1, 0, 0, 0, 1, 1, 1, 1, 0) |
| $S7_{k-5} \to S4_k$ | (1, 0, 0, 0, 0, 1, 1, 1, 1) | (1, 0, 0, 0, 1, 1, 1, 1, 1) |
| $S6_{k-5} \to S6_k$ | (1, 1, 0, 0, 0, 1, 1, 0, 0) | (1, 1, 0, 0, 1, 1, 1, 0, 0) |
| $S6_{k-5} \to S5_k$ | (1, 1, 0, 0, 0, 1, 1, 1, 0) | (1, 1, 0, 0, 1, 1, 1, 1, 0) |
| $S6_{k-5} \to S4_k$ | (1, 1, 0, 0, 0, 1, 1, 1, 1) | (1, 1, 0, 0, 1, 1, 1, 1, 1) |
| $S4_{k-5} \to S0_k$ | (1, 1, 1, 1, 0, 0, 0, 0, 0) | (1, 1, 1, 1, 1, 0, 0, 0, 0) |
| $S4_{k-5} \to S1_k$ | (1, 1, 1, 1, 0, 0, 0, 0, 1) | (1, 1, 1, 1, 1, 0, 0, 0, 1) |
| $S4_{k-5} \to S2_k$ | (1, 1, 1, 1, 0, 0, 0, 1, 1) | (1, 1, 1, 1, 1, 0, 0, 1, 1) |
| $S0_{k-6} \to S0_k$ | (0, 0, 0, 0, 0, 0, 0, 0, 0) | (0, 0, 0, 0, 1, 1, 0, 0, 0) |
| $S0_{k-6} \to S1_k$ | (0, 0, 0, 0, 0, 0, 0, 0, 1) | (0, 0, 0, 0, 1, 1, 0, 0, 1) |
| $S0_{k-6} \to S2_k$ | (0, 0, 0, 0, 0, 0, 0, 1, 1) | (0, 0, 0, 0, 1, 1, 0, 1, 1) |
| $S2_{k-6} \to S6_k$ | (0, 0, 1, 1, 0, 0, 1, 1, 0) | (0, 0, 1, 1, 1, 1, 1, 1, 0) |
| $S2_{k-6} \to S5_k$ | (0, 0, 1, 1, 0, 0, 1, 1, 1) | (0, 0, 1, 1, 1, 1, 1, 1, 1, 0) |
| $S2_{k-6} \to S4_k$ | (0, 0, 1, 1, 0, 0, 1, 1, 1) | (0, 0, 1, 1, 1, 1, 1, 1, 1) |
| $S3_{k-6} \to S6_k$ | (0, 1, 1, 1, 0, 0, 1, 1, 0) | (0, 1, 1, 1, 1, 1, 1, 1, 0) |
| $S3_{k-6} \to S5_k$ | (0, 1, 1, 1, 0, 0, 1, 1, 1) | (0, 1, 1, 1, 1, 1, 1, 1, 0) |
| $S3_{k-6} \to S4_k$ | (0, 1, 1, 1, 0, 0, 1, 1, 1) | (0, 1, 1, 1, 1, 1, 1, 1, 1) |
| $S7_{k-6} \to S0_k$ | (1, 0, 0, 0, 0, 0, 0, 0, 0) | (1, 0, 0, 0, 1, 1, 0, 0, 0) |
| $S7_{k-6} \to S1_k$ | (1, 0, 0, 0, 0, 0, 0, 0, 1) | (1, 0, 0, 0, 1, 1, 0, 0, 1) |
| $S7_{k-6} \to S2_k$ | (1, 0, 0, 0, 0, 0, 0, 1, 1) | (1, 0, 0, 0, 1, 1, 0, 1, 1) |
| $S6_{k-6} \to S0_k$ | (1, 1, 0, 0, 0, 0, 0, 0, 0) | (1, 1, 0, 0, 1, 1, 0, 0, 0) |
| $S6_{k-6} \to S1_k$ | (1, 1, 0, 0, 0, 0, 0, 0, 1) | (1, 1, 0, 0, 1, 1, 0, 0, 1) |
| $S6_{k-6} \to S2_k$ | (1, 1, 0, 0, 0, 0, 0, 1, 1) | (1, 1, 0, 0, 1, 1, 0, 1, 1) |
| $S4_{k-6} \to S6_k$ | (1, 1, 1, 1, 0, 0, 1, 1, 0) | (1, 1, 1, 1, 1, 1, 1, 1, 0) |
| $S4_{k-6} \to S5_k$ | (1, 1, 1, 1, 0, 0, 1, 1, 1, 0) | (1, 1, 1, 1, 1, 1, 1, 1, 0) |
| $S4_{k-6} \to S4_k$ | (1, 1, 1, 1, 0, 0, 1, 1, 1) | (1, 1, 1, 1, 1, 1, 1, 1, 1) |
| $S0_{k-7} \to S0_k$ | (0, 0, 0, 0, 0, 1, 1, 0, 0, 0, 0) | (0, 0, 0, 0, 1, 1, 0, 0, 0, 0, 0) |
| $S0_{k-7} \to S1_k$ | (0, 0, 0, 0, 0, 1, 1, 0, 0, 0, 1) | (0, 0, 0, 0, 1, 1, 0, 0, 0, 0, 1) |
| $S0_{k-7} \to S2_k$ | (0, 0, 0, 0, 0, 1, 1, 0, 0, 1, 1) | (0, 0, 0, 0, 1, 1, 0, 0, 0, 1, 1) |
| $S2_{k-7} \to S6_k$ | (0, 0, 1, 1, 0, 0, 1, 1, 1, 0, 0) | (0, 0, 1, 1, 1, 0, 0, 1, 1, 0, 0) |
| $S2_{k-7} \to S5_k$ | (0, 0, 1, 1, 0, 0, 1, 1, 1, 1, 0) | (0, 0, 1, 1, 1, 0, 0, 1, 1, 1, 0) |
| $S2_{k-7} \to S4_k$ | (0, 0, 1, 1, 0, 0, 1, 1, 1, 1, 1) | (0, 0, 1, 1, 1, 0, 0, 1, 1, 1, 1) |
| $S3_{k-7} \to S6_k$ | (0, 1, 1, 1, 0, 0, 1, 1, 1, 0, 0) | (0, 1, 1, 1, 1, 0, 0, 1, 1, 0, 0) |
| $S3_{k-7} \to S5_k$ | (0, 1, 1, 1, 0, 0, 1, 1, 1, 1, 0) | (0, 1, 1, 1, 1, 0, 0, 1, 1, 1, 0) |
| $S3_{k-7} \to S4_k$ | (0, 1, 1, 1, 0, 0, 1, 1, 1, 1, 1) | (0, 1, 1, 1, 1, 0, 0, 1, 1, 1, 1) |
| $S7_{k-7} \to S0_k$ | (1, 0, 0, 0, 0, 1, 1, 0, 0, 0, 0) | (1, 0, 0, 0, 1, 1, 0, 0, 0, 0, 0) |
| $S7_{k-7} \to S1_k$ | (1, 0, 0, 0, 0, 1, 1, 0, 0, 0, 1) | (1, 0, 0, 0, 1, 1, 0, 0, 0, 0, 1) |
| $S7_{k-7} \to S2_k$ | (1, 0, 0, 0, 0, 1, 1, 0, 0, 1, 1) | (1, 0, 0, 0, 1, 1, 0, 0, 0, 1, 1) |
| $S6_{k-7} \to S0_k$ | (1, 1, 0, 0, 0, 1, 1, 0, 0, 0, 0) | (1, 1, 0, 0, 1, 1, 0, 0, 0, 0, 0) |
| $S6_{k-7} \to S1_k$ | (1, 1, 0, 0, 0, 1, 1, 0, 0, 0, 1) | (1, 1, 0, 0, 1, 1, 0, 0, 0, 0, 1) |
| $S6_{k-7} \to S2_k$ | (1, 1, 0, 0, 0, 1, 1, 0, 0, 1, 1) | (1, 1, 0, 0, 1, 1, 0, 0, 0, 1, 1) |
| $S4_{k-7} \to S6_k$ | (1, 1, 1, 1, 0, 0, 1, 1, 1, 0, 0) | (1, 1, 1, 1, 1, 0, 0, 1, 1, 0, 0) |
| $S4_{k-7} \to S5_k$ | (1, 1, 1, 1, 0, 0, 1, 1, 1, 1, 0) | (1, 1, 1, 1, 1, 0, 0, 1, 1, 1, 0) |
| $S4_{k-7} \to S4_k$ | (1, 1, 1, 1, 0, 0, 1, 1, 1, 1, 1) | (1, 1, 1, 1, 1, 0, 0, 1, 1, 1, 1) |
| $S0_{k-8} \to S0_k$ | (0, 0, 0, 0, 0, 1, 1, 1, 0, 0, 0, 0) | (0, 0, 0, 0, 1, 1, 1, 0, 0, 0, 0, 0) |
| $S0_{k-8} \to S1_k$ | (0, 0, 0, 0, 0, 1, 1, 1, 0, 0, 0, 1) | (0, 0, 0, 0, 1, 1, 1, 0, 0, 0, 0, 1) |
| $S0_{k-8} \to S2_k$ | (0, 0, 0, 0, 0, 1, 1, 1, 0, 0, 1, 1) | (0, 0, 0, 0, 1, 1, 1, 0, 0, 0, 1, 1) |
| $S2_{k-8} \to S6_k$ | (0, 0, 1, 1, 0, 0, 0, 1, 1, 0, 0) | (0, 0, 1, 1, 1, 0, 0, 0, 1, 1, 0, 0) |
| $S2_{k-8} \to S5_k$ | (0, 0, 1, 1, 0, 0, 0, 1, 1, 1, 0) | (0, 0, 1, 1, 1, 0, 0, 0, 1, 1, 1, 0) |
| $S2_{k-8} \to S4_k$ | (0, 0, 1, 1, 0, 0, 0, 1, 1, 1, 1) | (0, 0, 1, 1, 1, 0, 0, 0, 1, 1, 1, 1) |
| $S3_{k-8} \to S6_k$ | (0, 1, 1, 1, 0, 0, 0, 1, 1, 0, 0) | (0, 1, 1, 1, 1, 0, 0, 0, 1, 1, 0, 0) |
| $S3_{k-8} \to S5_k$ | (0, 1, 1, 1, 0, 0, 0, 1, 1, 1, 0) | (0, 1, 1, 1, 1, 0, 0, 0, 1, 1, 1, 0) |
| $S3_{k-8} \to S4_k$ | (0, 1, 1, 1, 0, 0, 0, 1, 1, 1, 1) | (0, 1, 1, 1, 1, 0, 0, 0, 1, 1, 1, 1) |
| $S7_{k-8} \to S0_k$ | (1, 0, 0, 0, 0, 1, 1, 1, 0, 0, 0, 0) | (1, 0, 0, 0, 1, 1, 1, 0, 0, 0, 0, 0) |
| $S7_{k-8} \to S1_k$ | (1, 0, 0, 0, 0, 1, 1, 1, 0, 0, 0, 1) | (1, 0, 0, 0, 1, 1, 1, 0, 0, 0, 0, 1) |
| $S7_{k-8} \to S2_k$ | (1, 0, 0, 0, 0, 1, 1, 1, 0, 0, 1, 1) | (1, 0, 0, 0, 1, 1, 1, 0, 0, 0, 1, 1) |
| $S6_{k-8} \to S0_k$ | (1, 1, 0, 0, 0, 1, 1, 1, 0, 0, 0, 0) | (1, 1, 0, 0, 1, 1, 1, 0, 0, 0, 0, 0) |
| $S6_{k-8} \to S1_k$ | (1, 1, 0, 0, 0, 1, 1, 1, 0, 0, 0, 1) | (1, 1, 0, 0, 1, 1, 1, 0, 0, 0, 0, 1) |
| $S6_{k-8} \to S2_k$ | (1, 1, 0, 0, 0, 1, 1, 1, 0, 0, 1, 1) | (1, 1, 0, 0, 1, 1, 1, 0, 0, 0, 1, 1) |
| $S4_{k-8} \to S6_k$ | (1, 1, 1, 1, 0, 0, 0, 1, 1, 0, 0) | (1, 1, 1, 1, 1, 0, 0, 0, 1, 1, 0, 0) |
| $S4_{k-8} \to S5_k$ | (1, 1, 1, 1, 0, 0, 0, 1, 1, 1, 0) | (1, 1, 1, 1, 1, 0, 0, 0, 1, 1, 1, 0) |
| $S4_{k-8} \to S4_k$ | (1, 1, 1, 1, 0, 0, 0, 1, 1, 1, 1) | (1, 1, 1, 1, 1, 0, 0, 0, 1, 1, 1, 1) |
| $S0_{k-9} \to S0_k$ | (0, 0, 0, 0, 0, 1, 1, 1, 1, 0, 0, 0, 0) | (0, 0, 0, 0, 1, 1, 1, 1, 0, 0, 0, 0, 0) |

TABLE 8-continued

| State transition | Recording code $(b_{k-i}, \ldots, b_k)$ of path A | Recording code $(b_{k-i}, \ldots, b_k)$ of path B |
|---|---|---|
| $S0_{k-9} \to S1_k$ | (0, 0, 0, 0, 0, 1, 1, 1, 1, 0, 0, 0, 1) | (0, 0, 0, 0, 1, 1, 1, 1, 0, 0, 0, 0, 1) |
| $S0_{k-9} \to S2_k$ | (0, 0, 0, 0, 0, 1, 1, 1, 1, 0, 0, 1, 1) | (0, 0, 0, 0, 1, 1, 1, 1, 0, 0, 0, 1, 1) |
| $S2_{k-9} \to S6_k$ | (0, 0, 1, 1, 0, 0, 0, 0, 1, 1, 0, 0) | (0, 0, 1, 1, 1, 0, 0, 0, 0, 1, 1, 0, 0) |
| $S2_{k-9} \to S5_k$ | (0, 0, 1, 1, 0, 0, 0, 0, 1, 1, 1, 1, 0) | (0, 0, 1, 1, 1, 0, 0, 0, 0, 1, 1, 1, 0) |
| $S2_{k-9} \to S4_k$ | (0, 0, 1, 1, 0, 0, 0, 0, 1, 1, 1, 1, 1) | (0, 0, 1, 1, 1, 0, 0, 0, 0, 1, 1, 1, 1) |
| $S3_{k-9} \to S6_k$ | (0, 1, 1, 1, 0, 0, 0, 0, 1, 1, 0, 0) | (0, 1, 1, 1, 1, 0, 0, 0, 0, 1, 1, 0, 0) |
| $S3_{k-9} \to S5_k$ | (0, 1, 1, 1, 0, 0, 0, 0, 1, 1, 1, 1, 0) | (0, 1, 1, 1, 1, 0, 0, 0, 0, 1, 1, 1, 0) |
| $S3_{k-9} \to S4_k$ | (0, 1, 1, 1, 0, 0, 0, 0, 1, 1, 1, 1, 1) | (0, 1, 1, 1, 1, 0, 0, 0, 0, 1, 1, 1, 1) |
| $S7_{k-9} \to S0_k$ | (1, 0, 0, 0, 0, 1, 1, 1, 1, 0, 0, 0, 0) | (1, 0, 0, 0, 1, 1, 1, 1, 0, 0, 0, 0, 0) |
| $S7_{k-9} \to S1_k$ | (1, 0, 0, 0, 0, 1, 1, 1, 1, 0, 0, 0, 1) | (1, 0, 0, 0, 1, 1, 1, 1, 0, 0, 0, 0, 1) |
| $S7_{k-9} \to S2_k$ | (1, 0, 0, 0, 0, 1, 1, 1, 1, 0, 0, 1, 1) | (1, 0, 0, 0, 1, 1, 1, 1, 0, 0, 0, 1, 1) |
| $S6_{k-9} \to S0_k$ | (1, 1, 0, 0, 0, 1, 1, 1, 1, 0, 0, 0, 0) | (1, 1, 0, 0, 1, 1, 1, 1, 0, 0, 0, 0, 0) |
| $S6_{k-9} \to S1_k$ | (1, 1, 0, 0, 0, 1, 1, 1, 1, 0, 0, 0, 1) | (1, 1, 0, 0, 1, 1, 1, 1, 0, 0, 0, 0, 1) |
| $S6_{k-9} \to S2_k$ | (1, 1, 0, 0, 0, 1, 1, 1, 1, 0, 0, 1, 1) | (1, 1, 0, 0, 1, 1, 1, 1, 0, 0, 0, 1, 1) |
| $S4_{k-9} \to S6_k$ | (1, 1, 1, 1, 0, 0, 0, 0, 1, 1, 0, 0) | (1, 1, 1, 1, 1, 0, 0, 0, 0, 1, 1, 0, 0) |
| $S4_{k-9} \to S5_k$ | (1, 1, 1, 1, 0, 0, 0, 0, 1, 1, 1, 1, 0) | (1, 1, 1, 1, 1, 0, 0, 0, 0, 1, 1, 1, 0) |
| $S4_{k-9} \to S4_k$ | (1, 1, 1, 1, 0, 0, 0, 0, 1, 1, 1, 1, 1) | (1, 1, 1, 1, 1, 0, 0, 0, 0, 1, 1, 1, 1) |

In this case, it is determined which of the two paths A and B has the higher probability. This decision can be made by comparing the sum of errors between ideal sample values (i.e., expected values) shown by the path A and actual sample values with the sum of errors between associated ideal sample values (i.e., expected values) shown by the path B and the actual sample values.

For example, suppose the state transition $S0_{k-5} \to S6_k$ should be estimated. As for this state transition, no matter whether the path A or the path B has been taken, the state at the time k–5 is $S0_{k-5}$ and the state at the time k is $S6_k$. In this case, it is by using the sum of squared errors between the expected values and the actual values $y_{k-4}, y_{k-3}, y_{k-2}, y_{k-1}$, and $y_k$ of the read signal in the period between the times k–4 and k that it is determined which of the two paths A and B has the higher probability. As in the preferred embodiments described above, the sum of squared errors between the expected values shown by the path A and the actual values $y_{k-4}, y_{k-3}, y_{k-2}, y_{k-1}$, and $y_k$ of the read signal in the period between the times k–4 and k is identified by Pa. On the other hand, the sum of squared errors between the expected values shown by the path B and the actual values $y_{k-4}, y_{k-3}, y_{k-2}, y_{k-1}$ and $y_k$ of the read signal in the period between the times k–4 and k is identified by Pb. These sums of squared errors Pa and Pb (i.e., the error probabilities) are respectively given by the following Equations (21) and (22):

$$Pa = (y_{k-4} - 0)^2 + (y_{k-3} - C0)^2 + (y_{k-2} - (C0+C1))^2 + (y_{k-1} - (C0+C1+C2))^2 + (y_k - (2 \times C1+C2))^2 \quad (21)$$

$$Pb = (y_{k-4} - C0)^2 + (y_{k-3} - (C0+C1))^2 (y_{k-2} - (C0+C1C2))^2 + (y_{k-1} - (C0+2 \times C1+C2))^2 + (y_k - (C0+2 \times C1+C2))^2 \quad (22)$$

In this case, if Pa<<Pb, then the path A is estimated to be the more probable one. On the other hand, if Pa>>Pb, then the path B is estimated to be the more probable one. That is to say, even when a recorded code having a minimum polarity inversion interval of two is combined with the PR (C0, C1, C2, C1, C0) equalization technique, the reliability of the decoded result can also be evaluated by |Pa−Pb|. Also, the quality of the read signal can be evaluated (or the error rate can be estimated) based on the |Pa−Pb| distribution.

Furthermore, suppose white noise has been superposed on the transmission line. In that case, a state transition having the highest error probability should have a minimum Euclidean distance between the paths A and B. The eighteen state transition patterns shown in the following Table 9 should have the minimum Euclidean distance between their two paths:

TABLE 9

| State transition | Recording code $(b_{k-i}, \ldots, b_k)$ of path A | Recording code $(b_{k-i}, \ldots, b_k)$ of path B |
|---|---|---|
| $S0_{k-5} \to S6_k$ | (0, 0, 0, 0, 0, 1, 1, 0, 0) | (0, 0, 0, 0, 1, 1, 1, 0, 0) |
| $S0_{k-5} \to S5_k$ | (0, 0, 0, 0, 0, 1, 1, 1, 0) | (0, 0, 0, 0, 1, 1, 1, 1, 0) |
| $S0_{k-5} \to S4_k$ | (0, 0, 0, 0, 0, 1, 1, 1, 1) | (0, 0, 0, 0, 1, 1, 1, 1, 1) |
| $S2_{k-5} \to S0_k$ | (0, 0, 1, 1, 0, 0, 0, 0, 0) | (0, 0, 1, 1, 1, 0, 0, 0, 0) |
| $S2_{k-5} \to S1_k$ | (0, 0, 1, 1, 0, 0, 0, 0, 1) | (0, 0, 1, 1, 1, 0, 0, 0, 1) |
| $S2_{k-5} \to S2_k$ | (0, 0, 1, 1, 0, 0, 0, 1, 1) | (0, 0, 1, 1, 1, 0, 0, 1, 1) |
| $S3_{k-5} \to S0_k$ | (0, 1, 1, 1, 0, 0, 0, 0, 0) | (0, 1, 1, 1, 1, 0, 0, 0, 0) |
| $S3_{k-5} \to S1_k$ | (0, 1, 1, 1, 0, 0, 0, 0, 1) | (0, 1, 1, 1, 1, 0, 0, 0, 1) |
| $S3_{k-5} \to S2_k$ | (0, 1, 1, 1, 0, 0, 0, 1, 1) | (0, 1, 1, 1, 1, 0, 0, 1, 1) |
| $S7_{k-5} \to S6_k$ | (1, 0, 0, 0, 0, 1, 1, 0, 0) | (1, 0, 0, 0, 1, 1, 1, 0, 0) |
| $S7_{k-5} \to S5_k$ | (1, 0, 0, 0, 0, 1, 1, 1, 0) | (1, 0, 0, 0, 1, 1, 1, 1, 0) |
| $S7_{k-5} \to S4_k$ | (1, 0, 0, 0, 0, 1, 1, 1, 1) | (1, 0, 0, 0, 1, 1, 1, 1, 1) |
| $S6_{k-5} \to S6_k$ | (1, 1, 0, 0, 0, 1, 1, 0, 0) | (1, 1, 0, 0, 1, 1, 1, 0, 0) |
| $S6_{k-5} \to S5_k$ | (1, 1, 0, 0, 0, 1, 1, 1, 0) | (1, 1, 0, 0, 1, 1, 1, 1, 0) |
| $S6_{k-5} \to S4_k$ | (1, 1, 0, 0, 0, 1, 1, 1, 1) | (1, 1, 0, 0, 1, 1, 1, 1, 1) |
| $S4_{k-5} \to S0_k$ | (1, 1, 1, 1, 0, 0, 0, 0, 0) | (1, 1, 1, 1, 1, 0, 0, 0, 0) |
| $S4_{k-5} \to S1_k$ | (1, 1, 1, 1, 0, 0, 0, 0, 1) | (1, 1, 1, 1, 1, 0, 0, 0, 1) |
| $S4_{k-5} \to S2_k$ | (1, 1, 1, 1, 0, 0, 0, 1, 1) | (1, 1, 1, 1, 1, 0, 0, 1, 1) |

The reliabilities Pa−Pb of the 18 state transition patterns shown in Table 9 are given by the following Equations (23.1) through (23.18):

If $(c_{k-8}, c_{k-7}, c_{k-6}, c_{k-5}, c_{k-4}, c_{k-3}, c_{k-2}, c_{k-1}, c_k) = (0,0,0,0,x,1,1,0,0)$, then $Pa-Pb = (AA_{k-4} - BB_{k-4}) + (BB_{k-3} - CC_{k-3}) + (CC_{k-2} - EE_{k-2}) + (DD_{k-1} - FF_{k-1}) + (DD_k - EE_k);$ (23.1)

If $(c_{k-8}, c_{k-7}, c_{k-6}, c_{k-5}, c_{k-4}, c_{k-3}, c_{k-2}, c_{k-1}, c_k) = (0,0,0,0,x,1,1,1,0)$, then $Pa-Pb = (AA_{k-4} - BB_{k-4}) + (BB_{k-3} - CC_{k-3}) + (CC_{k-2} - EE_{k-2}) + (EE_{k-1} - GG_{k-1}) + (FF_k - GG_k);$ (23.2)

If $(c_{k-8}, c_{k-7}, c_{k-6}, c_{k-5}, c_{k-4}, c_{k-3}, c_{k-2}, c_{k-1}, c_k) = (0,0,0,0,x,1,1,1,1)$, then $Pa-Pb = (AA_{k-4} - BB_{k-4}) + (BB_{k-3} - CC_{k-3}) + (CC_{k-2} - EE_{k-2}) + (EE_{k-1} - GG_{k-1}) + (GG_k - JJ_k);$ (23.3)

If $(c_{k-8}, c_{k-7}, c_{k-6}, c_{k-5}, c_{k-4}, c_{k-3}, c_{k-2}, c_{k-1}, c_k) = (0,0,1,1,x,0,0,0,0)$, then $Pa-Pb = (DD_{k-4} - EE_{k-4}) + (DD_{k-3} - FF_{k-3}) + (CC_{k-2} - EE_{k-2}) + (BB_{k-1} - CC_{k-1}) + (AA_k - BB_k);$ (23.4)

If $(c_{k-8}, c_{k-7}, c_{k-6}, c_{k-5}, c_{k-4}, c_{k-3}, c_{k-2}, c_{k-1}, c_k) = (0,0,1,1,x,0,0,0,1)$, then $Pa-Pb = (DD_{k-4} - EE_{k-4}) + (DD_{k-3} - FF_{k-3}) + (CC_{k-2} - EE_{k-2}) + (BB_{k-1} - CC_{k-1}) + (BB_k - HH_k);$ (23.5)

If $(c_{k-8}, c_{k-7}, c_{k-6}, c_{k-5}, c_{k-4}, c_{k-3}, c_{k-2}, c_{k-1}, c_k) = (0,0,1,1,x,0,0,1,1)$, then $Pa-Pb = (DD_{k-4} - EE_{k-4}) + (DD_{k-3} - FF_{k-3}) + (CC_{k-2} - EE_{k-2}) + (HH_{k-1} - II_{k-1}) + (CC_k - II_k);$ (23.6)

If $(c_{k-8}, c_{k-7}, c_{k-6}, c_{k-5}, c_{k-4}, c_{k-3}, c_{k-2}, c_{k-1}, c_k) = (0,1,1,1,x,0,0,0,0)$, then $Pa-Pb = (FF_{k-4} - GG_{k-4}) + (EE_{k-3} - GG_{k-3}) + (CC_{k-2} - EE_{k-2}) + (BB_{k-1} - CC_{k-1}) + (AA_k - BB_k);$ (23.7)

If $(c_{k-8}, c_{k-7}, c_{k-6}, c_{k-5}, c_{k-4}, c_{k-3}, c_{k-2}, c_{k-1}, c_k) =$
(0,1,1,1,x,0,0,0,1), then $Pa-Pb = (FF_{k-4}-GG_{k-4}) + (EE_{k-3}-GG_{k-3}) + (CC_{k-2}-EE_{k-2}) + (BB_{k-1}-CC_{k-1}) + (BB_k-HH_k)$; (23.8)

If $(c_{k-8}, c_{k-7}, c_{k-6}, c_{k-5}, c_{k-4}, c_{k-3}, c_{k-2}, c_{k-1}, c_k) =$
(0,1,1,1,x,0,0,1,1), then $Pa-Pb = (FF_{k-4}-GG_{k-4}) + (EE_{k-3}-GG_{k-3}) + (CC_{k-2}-EE_{k-2}) + (HH_{k-1}-II_{k-1}) + (CC_k-II_k)$; (23.9)

If $(c_{k-8}, c_{k-7}, c_{k-6}, c_{k-5}, c_{k-4}, c_{k-3}, c_{k-2}, c_{k-1}, c_k) =$
(1,0,0,0,x,1,1,0,0), then $Pa-Pb = (BB_{k-4}-HH_{k-4}) + (BB_{k-3}-CC_{k-3}) + (CC_{k-2}-EE_{k-2}) + (DD_{k-1}-FF_{k-1}) + (DD_k-EE_k)$; (23.10)

If $(c_{k-8}, c_{k-7}, c_{k-6}, c_{k-5}, c_{k-4}, c_{k-3}, c_{k-2}, c_{k-1}, c_k) =$
(1,0,0,0,x,1,1,1,0), then $Pa-Pb = (BB_{k-4}-HH_{k-4}) + (BB_{k-3}-CC_{k-3}) + (CC_{k-2}-EE_{k-2}) + (EE_{k-1}-GG_{k-1}) + (FF_k-GG_k)$; (23.11)

If $(c_{k-8}, c_{k-7}, c_{k-6}, c_{k-5}, c_{k-4}, c_{k-3}, c_{k-2}, c_{k-1}, c_k) =$
(1,0,0,0,x,1,1,1,1), then $Pa-Pb = (BB_{k-4}-HH_{k-4}) + (BB_{k-3}-CC_{k-3}) + (CC_{k-2}-EE_{k-2}) + (EE_{k-1}-GG_{k-1}) + (GG_k-JJ_k)$; (23.12)

If $(c_{k-8}, c_{k-7}, c_{k-6}, c_{k-5}, c_{k-4}, c_{k-3}, c_{k-2}, c_{k-1}, c_k) =$
(1,1,0,0,x,1,1,0,0), then $Pa-Pb = (CC_{k-4}-II_{k-4}) + (HH_{k-3}-II_{k-3}) + (CC_{k-2}-EE_{k-2}) + (DD_{k-1}-FF_{k-1}) + (DD_k-EE_k)$; (23.13)

If $(c_{k-8}, c_{k-7}, c_{k-6}, c_{k-5}, c_{k-4}, c_{k-3}, c_{k-2}, c_{k-1}, c_k) =$
(1,1,0,0,x,1,1,1,0), then $Pa-Pb = (CC_{k-4}-II_{k-4}) + (HH_{k-3}-II_{k-3}) + (CC_{k-2}-EE_{k-2}) + (EE_{k-1}-GG_{k-1}) + (FF_k-GG_k)$; (23.14)

If $(c_{k-8}, c_{k-7}, c_{k-6}, c_{k-5}, c_{k-4}, c_{k-3}, c_{k-2}, c_{k-1}, c_k) =$
(1,1,0,0,x,1,1,1,1), then $Pa-Pb = (CC_{k-4}-II_{k-4}) + (HH_{k-3}-II_{k-3}) + (CC_{k-2}-EE_{k-2}) + (EE_{k-1}-GG_{k-1}) + (GG_k-JJ_k)$; (23.15)

If $(c_{k-8}, c_{k-7}, c_{k-6}, c_{k-5}, c_{k-4}, c_{k-3}, c_{k-2}, c_{k-1}, c_k) =$
(1,1,1,1,x,0,0,0,0), then $Pa-Pb = (GG_{k-4}-JJ_{k-4}) + (EE_{k-3}-GG_{k-3}) + (CC_{k-2}-EE_{k-2}) + (BB_{k-1}-CC_{k-1}) + (AA_k-BB_k)$; (23.16)

If $(c_{k-8}, c_{k-7}, c_{k-6}, c_{k-5}, c_{k-4}, c_{k-3}, c_{k-2}, c_{k-1}, c_k) =$
(1,1,1,1,x,0,0,0,1), then $Pa-Pb = (GG_{k-4}-JJ_{k-4}) + (EE_{k-3}-GG_{k-3}) + (CC_{k-2}-EE_{k-2}) + (BB_{k-1}-CC_{k-1}) + (BB_k-HH_k)$; and (23.17)

If $(c_{k-8}, c_{k-7}, c_{k-6}, c_{k-5}, c_{k-4}, c_{k-3}, c_{k-2}, c_{k-1}, c_k) =$
(0,1,1,1,x,0,0,1,1), then $Pa-Pb = (GG_{k-4}-JJ_{k-4}) + (EE_{k-3}-GG_{k-3}) + (CC_{k-2}-EE_{k-2}) + (HH_{k-1}-II_{k-1}) + (CC_k-II_k)$. (23.18)

where $c_k$ is the decoded result, k is an integer and $AA_k$, $BB_k$, $CC_k$, $DD_k$, $EE_k$, $FF_k$, $GG_k$, $HH_k$, $II_k$ and $JJ_k$ are given by:
$AA_k = (y_k-0)^2$,
$BB_k = (y_k-C0)^2$,
$CC_k = (y_k-(C0+C1))^2$,
$DD_k = (y_k-(C1+C2))^2$,
$EE_k = (y_k-(C0+C1+C2))^2$,
$FF_k = (y_k-(2 \times C1+C2))^2$,
$GG_k = (y_k-(C0+2 \times C1+C2))^2$,
$HH_k = (y_k-2 \times C0)^2$,
$II_k = (y_k-(2 \times C0+C1))^2$ and
$JJ_k = (y_k-(2 \times C0+2 \times C1+C2))^2$ $|Pa-Pb|-(2 \times C0^2+2 \times C1^2+C2^2)$ that satisfies Equations (23.1) through (23.18) is derived from the decoded result $c_k$ and the standard deviation σ and average Pave are obtained from its distribution. Supposing that distribution is a normal distribution, the error probability is given by the following Equation (24):

$$P(\sigma, Pave) = \mathrm{erfc}\left(\frac{Pave}{\sigma}\right) \quad (24)$$

Thus, the standard deviation σ and average Pave may be used to estimate the error rate of the read signal or evaluate the quality of the read signal.

As described above, even when a recorded code having a minimum polarity inversion interval of two is used in combination with the PR (C0, C1, C2, C1, C0) equalization, the quality of the read signal can also be evaluated by the difference in probability |Pa-Pb| between the two paths of state transitions occurring in a predetermined period.

Embodiment 2

Hereinafter, a second specific preferred embodiment of the present invention will be described. The second preferred embodiment relates to a specific method of calculating the probabilities of respective states and the reliability Pa-Pb of the decoded result where the read signal is decoded by a PRML decoding method (e.g., the PR (1, 2, 2, 1) equalization technique described above).

As described above, when the PR (1, 2, 2, 1) equalization technique is adopted, a trellis diagram such as that shown in FIG. 4 is obtained. In the preferred embodiment described above, the probabilities $L_k^{S0}$ through $L_k^{S5}$ of the respective states S0 through S5 at the time k are given by the following Equations (25):

$L_k^{S0} = \min[L_{k-1}^{S0}+(y_k+3)^2/2-y_k^2/2, L_{k-1}^{S5}+(y_k+2)^2/2-y_k^2/2]$ $L_k^{S1} = \min[L_{k-1}^{S0}+(y_k+2)^2/2-y_k^2/2, L_{k-1}^{S5}+(y_k+1)^2/2-y_k^2/2]$ $L_k^{S2} = L_{k-1}^{S1}+(y_k+0)^2$ $L_k^{S3} = \min[L_{k-1}^{S3}+(y_k-3)^2, L_{k-1}^{S2}+(y_k-2)^2]$ $L_k^{S4} = \min[L_{k-1}^{S3}+(y_k-2)^2, L_{k-1}^{S2}+(y_k-1)^2]$ $L_k^{S5} = L_{k-1}^{S4}+(y_k+0)^2$ (25)

where $L_{k-1}^{S0}$ through $L_{k-1}^{S5}$ are the probabilities of the respective states S0 through S5 at the previous time k−1, $y_k$ is the actual sample value at the time k, and min [xxx, zzz] is an operator indicating that the smaller one of xxx and zzz should be selected.

In this preferred embodiment, however, each branch metric (e.g., $(y_k+3)^2$) to be added to its associated probability (e.g., $L_{k-1}^{S0}$) at the previous time k−1 is always divided by two and then $y_k^2/2$ is always subtracted from the sum. In the PRML decoding method, the smallest one of the probabilities $L_k^{S0}$ through $L_k^{S5}$ may be selected by comparing them with each other. Accordingly, if these calculation rules are applied to all of the equations for obtaining $L_k^{S0}$ through $L_k^{S5}$, then the decoded result will not be affected at all. Thus, the probabilities $L_k^{S0}$ through $L_k^{S5}$ of the respective states S0 through S5 at the time k may be given by the following Equations (26):

$L_k^{S0} = \min[L_{k-1}^{S0}+(y_k+3)^2/2-y_k^2/2, L_{k-1}^{S5}+(y_k+2)^2/2-y_k^2/2]$ $L_k^{S1} = \min[L_{k-1}^{S0}+(y_k+2)^2/2-y_k^2/2, L_{k-1}^{S5}+(y_k+1)^2/2-y_k^2/2]$ $L_k^{S2} = L_{k-1}^{S1}+(y_k+0)^2/2-y_k^2/2$ $L_k^{S3} = \min[L_{k-1}^{S3}+(y_k-3)^2/2-y_k^2/2, L_{k-1}^{S2}+(y_k-2)^2/2-y_k^2/2]$ $$L_k^{S4}=\min[L_{k-1}^{S3}+(y_k-2)^2/2-y_k^2/2, L_{k-1}^{S2}+(y_k-1)^2/2-y_k^2/2]$$

$$L_k^{S5}=L_{k-1}^{S4}+(y_k+0)^2/2-y_k^2/2 \qquad (26)$$

These Equations (26) may be expanded into the following Equations (27):

$$L_k^{S0}=\min[L_{k-1}^{S0}+3y_k+9/2, L_{k-1}^{S5}+2y_k+2]$$

$$L_k^{S1}=\min[L_{k-1}^{S0}+2y_k+2, L_{k-1}^{S5}+y_k+1/2]$$

$$L_k^{S2}=\min L_{k-1}^{S1}$$

$$L_k^{S3}=\min[L_{k-1}^{S3}-3y_k+9/2, L_{k-1}^{S2}-2y_k+2]$$

$$L_k^{S4}=\min[L_{k-1}^{S3}-2y_k+2, L_{k-1}^{S2}-1/2]$$

$$L_k^{S5}=L_{k-1}^{S4} \qquad (27)$$

In this case, $A_k$, $B_k$, $C_k$, $D_k$, $E_k$, $F_k$ and $G_k$ are defined as follows:

$$A_k=3y_k+9/2=(y_k-th4)+(y_k-th5)+(y_k-th6)$$

$$B_k=2y_k2=(y_k-th4)+(y_k-th5)$$

$$C_k=y_k+1/2=(y_k-th4)$$

$$E_k=-y_k+1/2=(th3-y_k)$$

$$F_k=-2y_k+2=(th3-y_k)+(th2-y_k)$$

$$G_k=-3y_k+9/2=(th3-y_k)+(th2-y_k)+(th1-y_k)$$

where th1=5/2, th2=3/2, th3=1/2, th4=−1/2, th5=−3/2 and th6=−5/2.

In this manner, when the sample value $y_k$ is detected at the time k, the probabilities $L_k^{S0}$ through $L_k^{S5}$ of the respective states S0 through S5 at the time k may be obtained by calculating $A_k$ through $G_k$ through simple multiplications and additions following the Equations (27), i.e., without calculating the squared errors between the ideal values and the actual sample values. Thus, the circuit configuration of the ML decoder does not have to be so complicated.

As already described for the first preferred embodiment, the quality of the read signal may be evaluated by obtaining the difference in probability |Pa−Pb| between two possible state transition paths (i.e., paths A and B). However, this |Pa−Pb| calculation may also be a relatively simple one that includes no square calculations. Hereinafter, an alternative simplified method of calculating |Pa−Pb| will be described specifically.

In the first preferred embodiment described above, where the PR (1, 2, 2, 1) equalization technique is adopted, the Pa−Pb values are preferably obtained for such pairs of paths A and B as having the minimum Euclidean distance between them. As for the 16 state transitions shown in Table 2, for example, the Pa−Pb values are preferably obtained for the eight state transitions that result in Pa−Pb=±10 when Pa=0 or Pb=0.

For example, the Pa−Pb value may be obtained in the following manner for the $S0_{k-4} \rightarrow S4_k$ transition, which is one of those eight state transitions resulting in Pa−Pb=4±10. In this case, the path A includes state transitions of S0→S0→S1→S2→S4 and the path B includes state transitions of S0→S1→S2→S3→S4. Then, the probability Pa of the path A may be given by:

$$Pa=(y_{k-3}+3)^2/2+(y_{k-2}+2)^2/2+(y_{k-1}+0)^2/2+(y_k-1)^2/2$$

n the other hand, the probability Pb of the path B may be given by:

$$Pb=(y_{k-3}+2)^2/2+(y_{k-2}+0)^2/2+(y_{k-1}-2)^2/2+(y_k-2)^2/2$$

In this case, by using the $A_k$ through $G_k$ values, the Pa−Pb may be obtained by:

$$Pa-Pb=(A_{k-3}-B_{k-3})+B_{k-2}-F_{k-1}+(E_k-F_k)$$

In this manner, according to this preferred embodiment, the Pa−Pb value can be calculated by using the $A_k$ through $G_k$ values that are obtained through simple additions and subtractions on the sample value $y_k$ and the preset values th1 through th6. Thus, the Pa−Pb value can be obtained relatively easily without performing the square calculations. As a result, the ML decoder may have a simplified circuit configuration.

The Pa−Pb values may also be calculated by using the $A_k$ through $G_k$ values in a similar manner for the other state transitions. The Pa−Pb values of some of the other state transitions may be obtained in the following manner:

As for state transition $S0_{k-4} \rightarrow S3_k$:

$$Pa-Pb=(A_{k-3}-B_{k-3})+B_{k-2}-F_{k-1}+(F_k-G_k)$$

As for state transition $S2_{k-4} \rightarrow S0_k$:

$$Pa-Pb=(E_{k-3}-F_{k-3})-F_{k-2}+B_{k-1}+(A_k-B_k)$$

As for state transition $S2_{k-4} \rightarrow S1_k$:

$$Pa-Pb=(E_{k-3}-F_{k-3})-F_{k-2}+B_{k-1}+(B_k-C_k)$$

As for state transition $S5_{k-4} \rightarrow S4_k$:

$$Pa-Pb=(B_{k-3}-C_{k-3})+B_{k-2}-F_{k-1}+(E_k-F_k)$$

As for state transition $S5_{k-4} \rightarrow S3_k$:

$$Pa-Pb=(B_{k-3}-C_{k-3})+B_{k-2}-F_{k-1}+(F_k-G_k)$$

As for state transition $S3_{k-4} \rightarrow S0_k$:

$$Pa-Pb=(F_{k-3}-G_{k-3})-F_{k-2}+B_{k-1}+(A_k-B_k)$$

As for state transition $S3_{k-4} \rightarrow S1_k$:

$$Pa-Pb=(F_{k-3}-G_{k-3})-F_{k-2}+B_{k-1}+(B_k-C_k)$$

Embodiment 3

Hereinafter, a third specific preferred embodiment of the present invention will be described with reference to FIG. 7. The third preferred embodiment relates to an optical disk drive 100 for use to decode a read signal by a PRML decoding method.

In the optical disk drive 100, a read signal, which has been read out from an optical disk 8 by an optical head 50, is amplified by a preamplifier 9. The pre-amplified signal is subjected to AC coupling and then input to an automatic gain controller (AGC) 10. The AGC 10 controls the gain of its input signal so that the output of a waveform equalizer 11 on the next stage will have predetermined amplitude. The gain-controlled output signal of the AGC 10 has its waveform shaped by the waveform equalizer 11. Then, the waveform-shaped output signal of the waveform equalizer 11 is supplied to both a PLL circuit 12 and an A/D converter 13.

Figure 1:
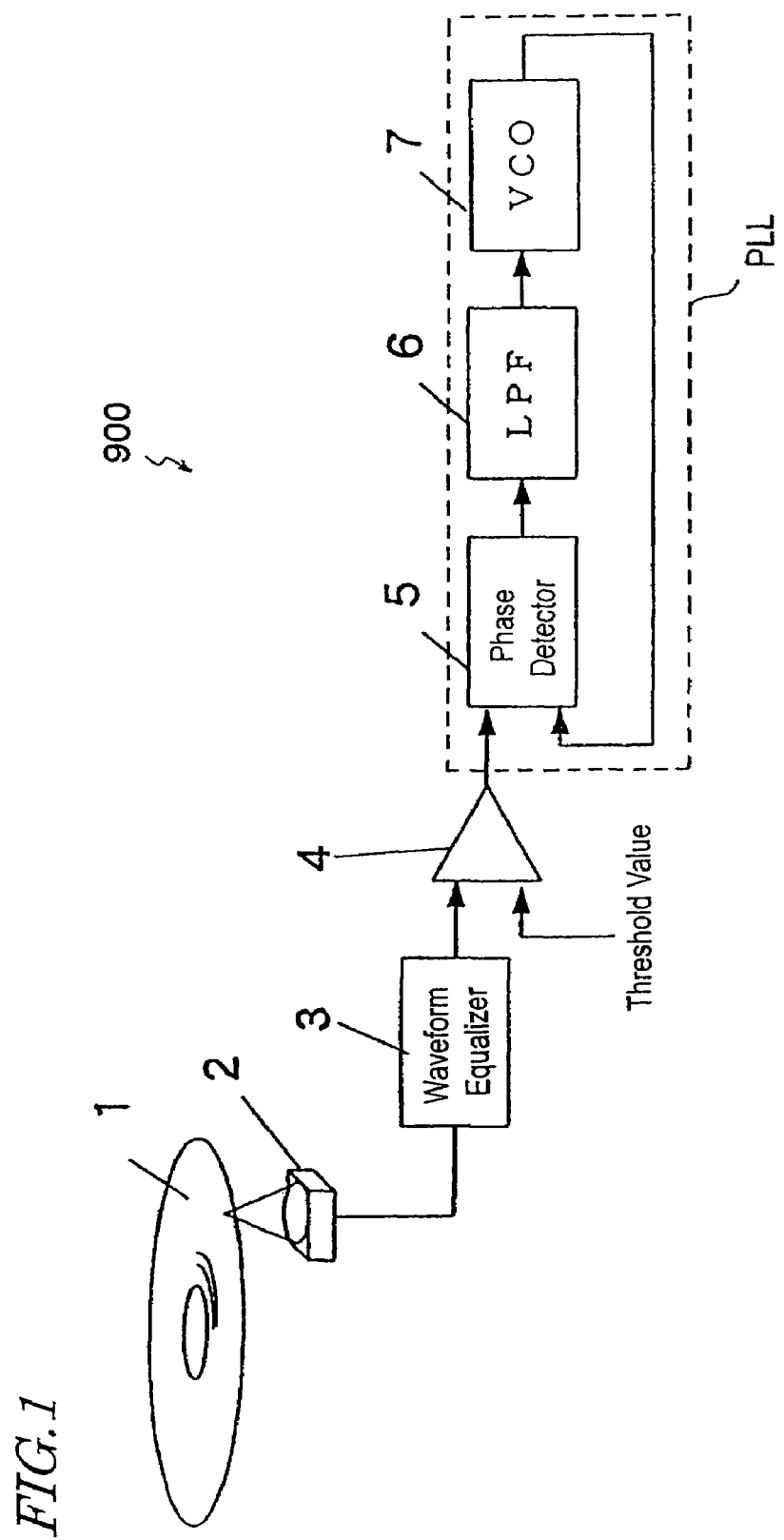
FIG. 1 is a block diagram illustrating a configuration for a conventional optical disk drive.

The PLL circuit 12 generates a read clock signal that is synchronized with the read signal. The PLL circuit 12 may have the same configuration as the conventional PLL circuit shown in FIG. 1 (including the phase detector 5, LPF 6 and VCO 7). In response to the read clock signal that is supplied from the PLL circuit 12, the A/D converter 13 samples the read signal. The A/D converter 13 outputs the sampled data obtained in this manner to a digital filter 14.

The digital filter 14 has a frequency characteristic that has been defined so as to match the frequency characteristic of the read/write systems with the characteristic required by a Viterbi circuit 15. In this preferred embodiment, the characteristic required by the Viterbi circuit 15 is a PR (1, 2, 2, 1) equalization characteristic. The output filtered data of the digital filter 14 is input to the Viterbi circuit 15, which decodes the data by a maximum likelihood decoding method. More specifically, the Viterbi circuit 15 decodes the PR (1, 2, 2, 1) equalized signal by the maximum likelihood decoding, thereby outputting digital-data.

The Viterbi circuit 15 outputs not only the decoded digital data but also Euclidean distances that have been calculated at respective points in time (i.e., branch metrics) to a differential metric analyzer 16. The differential metric analyzer 16 estimates possible state transitions from the digital data that has been supplied from the Viterbi circuit 15. Also, the differential metric analyzer 16 derives Pa–Pb, representing the reliability of the decoded result, from the estimated state transitions and the branch metrics, thereby estimating the error rate of the decoded result.

Figure 8:
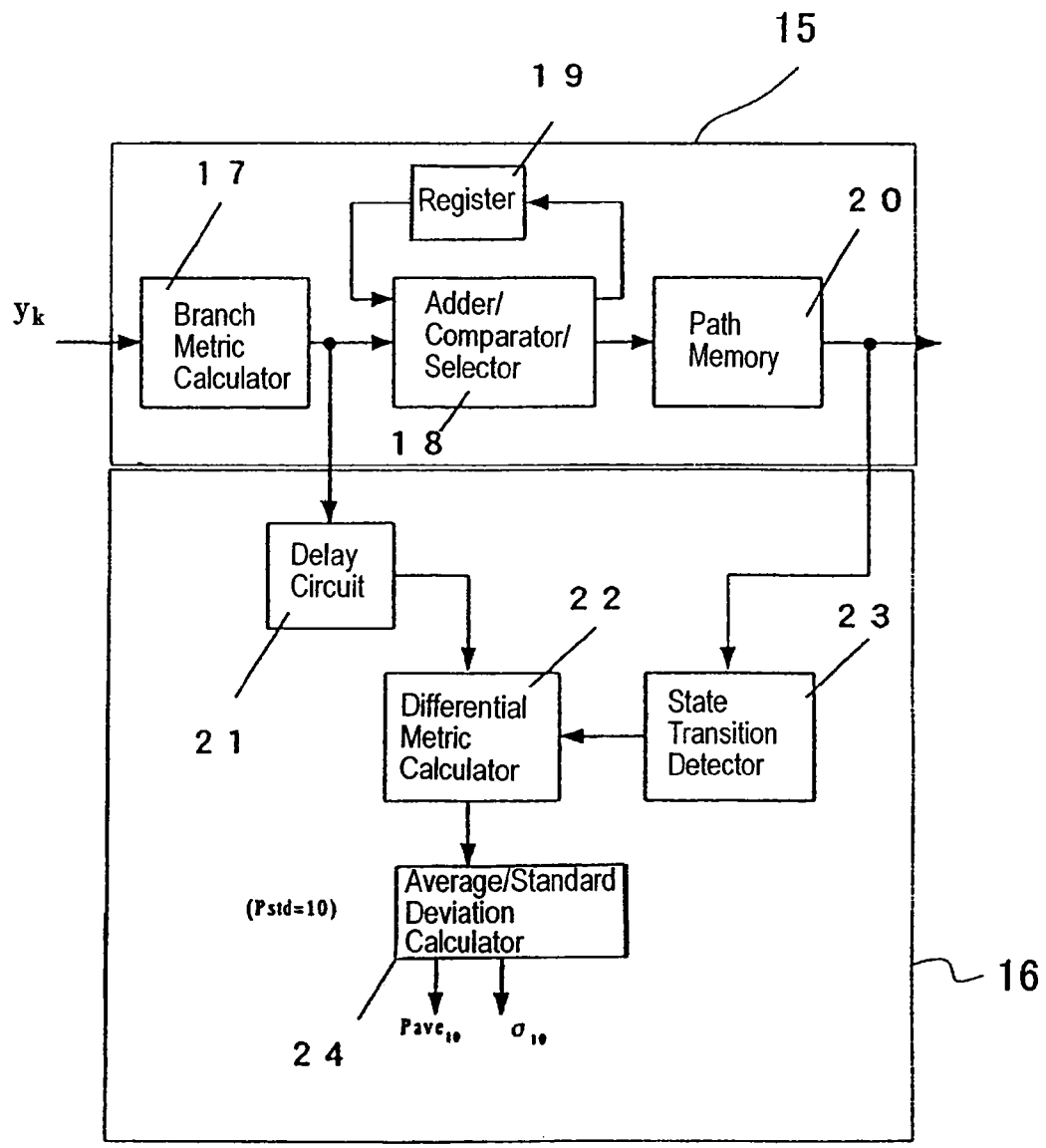
FIG. 8 is a block diagram illustrating detailed configurations of the Viterbi circuit and differential metric analyzer of the optical disk drive shown in FIG. 7.

Hereinafter, the Viterbi circuit 15 and the differential metric analyzer 16 will be described in further detail with reference to FIG. 8. FIG. 8 is a block diagram illustrating an exemplary configuration for the Viterbi circuit 15 and differential metric analyzer 16. Sample values $y_k$ that have been output from the digital filter 14 are input to a branch metric calculator 17 of the Viterbi circuit 15. The branch metric calculator 17 calculates respective branch metrics corresponding to the distances between the sample values $y_k$ and their associated expected values Level$_v$. Since the PR (1, 2, 2, 1) equalization technique is adopted in this preferred embodiment, the expected values Level$_v$ have seven values of 0 through 6. The branch metrics $A_k$, $B_k$, $C_k$, $D_k$, $E_k$, $F_k$ and $G_k$ representing the respective distances between the expected values and sample values $y_k$ at the time k are defined by the following Equations (28):

$$A_k=(y_k-0)^2,$$

$$B_k=(y_k-1)^2,$$

$$C_k=(y_k-2)^2,$$

$$D_k=(y_k-3)^2,$$

$$E_k=(y_k-3)^2,$$

$$F_k=(y_k-5)^2 \text{ and}$$

$$G_k=(y_k-6)^2 \quad (28)$$

Figure 9:
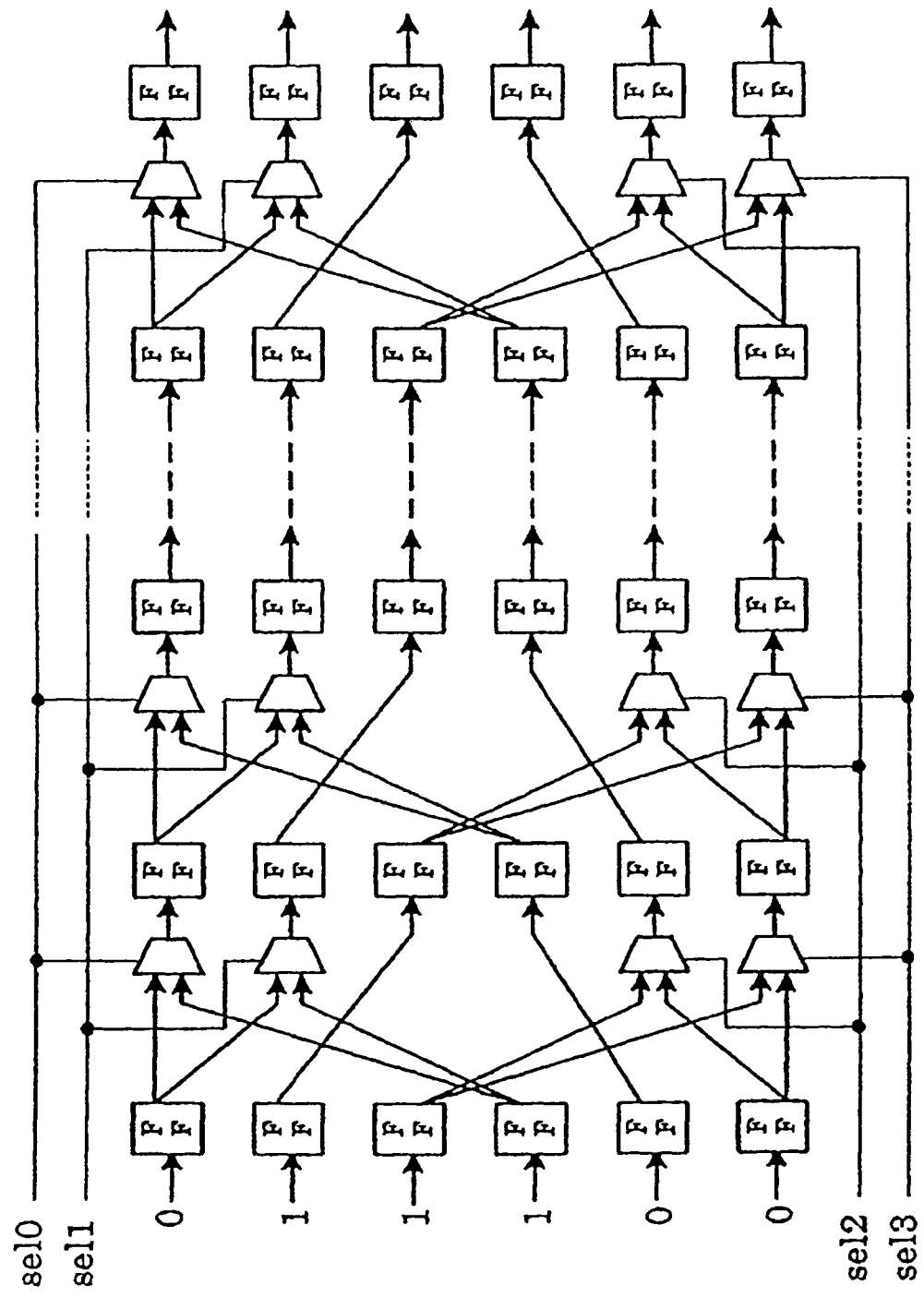
FIG. 9 is a diagram illustrating a detailed configuration of the path memory of the optical disk drive shown in FIG. 7.

The branch metrics that have been calculated in this manner are input to an adder/comparator/selector 18. The probabilities (i.e., metric values) of the respective states S0 through S5 (see FIG. 4) at a current time k are obtained from the branch metrics at the current time k and the probabilities of those states S0 through S5 at the previous time k−1. The probabilities of the respective states S0 through S5 at the current time k are given by the following Equations (29):

$$L_k^{S0}=\min[L_{k-1}^{S0}+A_k, L_{k-1}^{S5}+B_k]$$

$$L_k^{S1}=\min[L_{k-1}^{S0}+B_k, L_{k-1}^{S5}+C_k]$$

$$L_k^{S2}=L_{k-1}^{S1}+D_k$$

$$L_k^{S3}=\min[L_{k-1}^{S3}+G_k, L_{k-1}^{S2}+F_k]$$

$$L_k^{S4}=\min[L_{k-1}^{S3}+F_k, L_{k-1}^{S2}+E_k]$$

$$L_k^{S5}=L_{k-1}^{S4}+D_k \quad (29)$$

where min [xxx, zzz] is an operator indicating that the smaller one of the two values xxx and zzz should be selected. The metric values $L_k^{S0}$ through $L_k^{S5}$ at the time k are stored in a register 19 and will be used to calculate metric values of the respective states S0 through S5 at the next time k+1. The adder/comparator/selector 18 selects state transitions that have the minimum metric values in accordance with Equations (29). Also, based on the results of selection, the adder/comparator/selector 18 outputs control signals Se10 through Se13 to a path memory 20, which has a circuit configuration such as that shown in FIG. 9, in accordance with the following Inequalities (30):

If $L_{k-1}^{S0}+A_k \geq L_{k-1}^{S5}+B_k$, then Sel0="1"

If $L_{k-1}^{S0}+A_k \geq L_{k-1}^{S5}+B_k$, then Sel0="1"

If $L_{k-1}^{S0}+A_k < L_{k-1}^{S5}+B_k$, then Sel0="0"

If $L_{k-1}^{S0}+B_k \geq L_{k-1}^{S5}+C_k$, then Sel1="1"

If $L_{k-1}^{S0}+B_k < L_{k-1}^{S5}+C_k$, then Sel1="0"

If $L_{k-1}^{S3}+G_k \geq L_{k-1}^{S2}+F_k$, then Sel2="1"

If $L_{k-1}^{S3}+G_k < L_{k-1}^{S2}+F_k$, then Sel2="0"

If $L_{k-1}^{S3}+F_k \geq L_{k-1}^{S2}+E_k$, then Sel3="1"

If $L_{k-1}^{S3}+F_k < L_{k-1}^{S2}+E_k$, then Sel3="0"

In response to the input control signals, the path memory 20 estimates most probable state transition paths according to the state transition rule and outputs digital decoded data $c_k$ corresponding to the estimated state transition paths.

On the other hand, to evaluate the quality of the read signal, the branch metrics that have been output from the branch metric calculator 17 are input to a delay circuit 21. The output of the branch metrics to a differential metric calculator 22 is delayed for the amount of time corresponding to the time it takes for the adder/comparator/selector 18 and the path memory 20 to perform their signal processing. In the meantime, the output digital data $c_k$ of the path memory 20 is input to a state transition detector 23, which detects predetermined patterns from the digital data $c_k$. Specifically, the state transition detector 23 detects data patterns corresponding to the eight state transitions given by Equations (9.1) though (9.8). When the state transition detector 23 detects the predetermined state transitions, the differential metric calculator 22 calculates the Pa–Pb values of those detected state transitions in accordance with the Equations (9.1) through (9.8).

It should be noted that the Pa–Pb values may be calculated by a method including no square calculations as described for the second preferred embodiment. In the method of the second preferred embodiment, the Pa–Pb values may be obtained without using the branch metrics that have been calculated by the branch metric calculator 17. Accordingly, in that case, the sample values $y_k$ that have been output from the digital filter 14 may be directly input to the differential metric calculator 22 by way of the delay circuit 21 only. The differential metric calculator 22 may obtain the Pa–Pb values from the sample values $y_k$ by the method described for the second preferred embodiment.

The Pa–Pb values that have been calculated in this manner for the predetermined state transitions detected are input to an average/standard deviation calculator 24. The average/standard deviation calculator 24 obtains and outputs the average Pave$_{10}$, and the standard deviation $\sigma_{10}$ of the distribution of the input Pa–Pb values. It should be noted that the average $Pave_{10}$ and the standard deviation $\sigma_{10}$ to be output in this case are obtained for predetermined state transitions, each having two possible paths with a minimum Euclidean distance between them (i.e., having relatively high error probabilities). According to Equation (11), the error rate of the read signal can be estimated by using the average $Pave_{10}$ and the standard deviation $\sigma_{10}$. That is to say, the standard deviation and the average obtained by the average/standard deviation calculator 24 may be used as indices that indicate the quality of the read signal and that are correlated with the error rate. It should be noted that the error rate may also be obtained with the average $Pave_{10}$ supposed to be zero because the average is expected to be approximately equal to zero.

Figure 7:
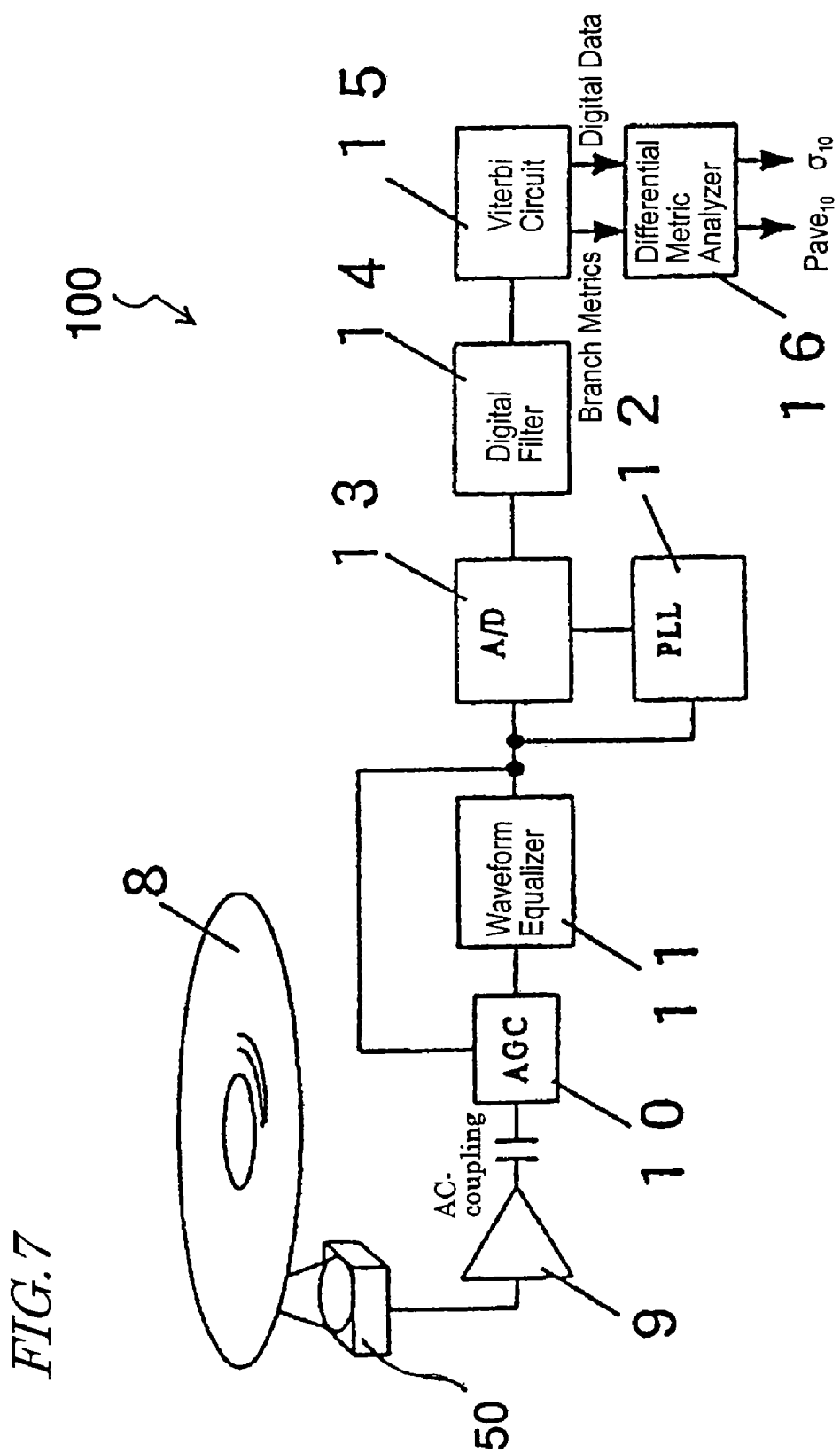
FIG. 7 is a block diagram illustrating a configuration for an optical disk drive %; as an exemplary apparatus for evaluating the quality of a read signal according to a third specific preferred embodiment of the present invention.
Figure 10:
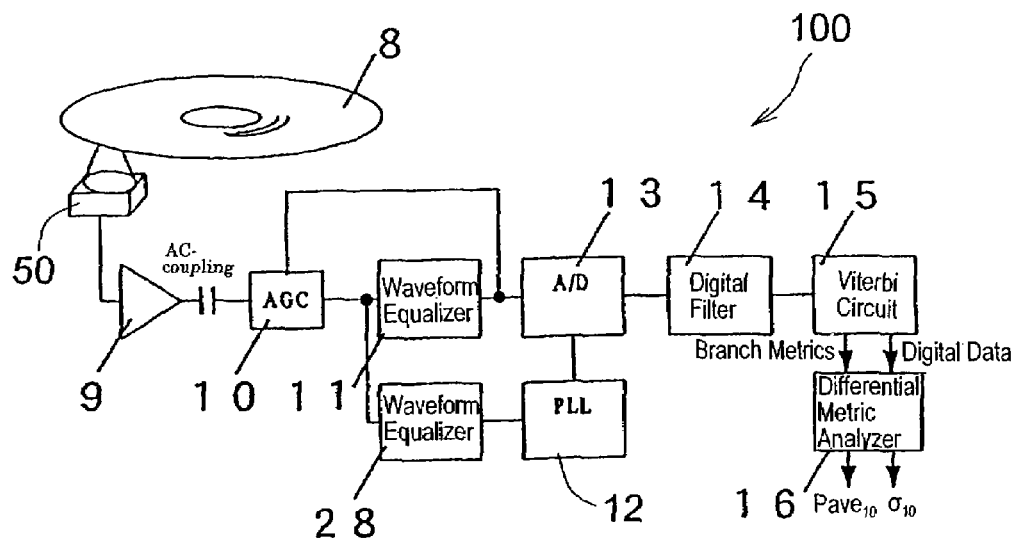
FIG. 10 is a block diagram illustrating a configuration for another optical disk drive according to the third preferred embodiment.

The optical disk drive 100 according to the preferred embodiment described above has a configuration such as that shown in FIG. 7. Alternatively, the optical disk drive 100 may further include another waveform equalizer 28 having such an equalization characteristic as to allow the PLL circuit 12 to generate a clock signal more appropriately as shown in FIG. 10. Just like the optical disk drive 100 shown in FIG. 7, the optical disk drive 100 shown in FIG. 10 can also obtain the standard deviation and the average and can evaluate the quality of the read signal by using them. In addition, by separately providing two waveform equalizers for shaping the waveform in such a manner as to get the clock signal generated more appropriately and to get the read signal adapted to the PRML decoding method more suitably, respectively, a preferred read clock signal can be generated and the read signal can be decoded by the PRML decoding method more accurately. An optical disk drive like this, including two or more waveform equalizers, is disclosed in U.S. patent application Ser. No. 09/996,843, which was filed by the applicant of the present application and which is hereby incorporated by reference.

Figure 11:
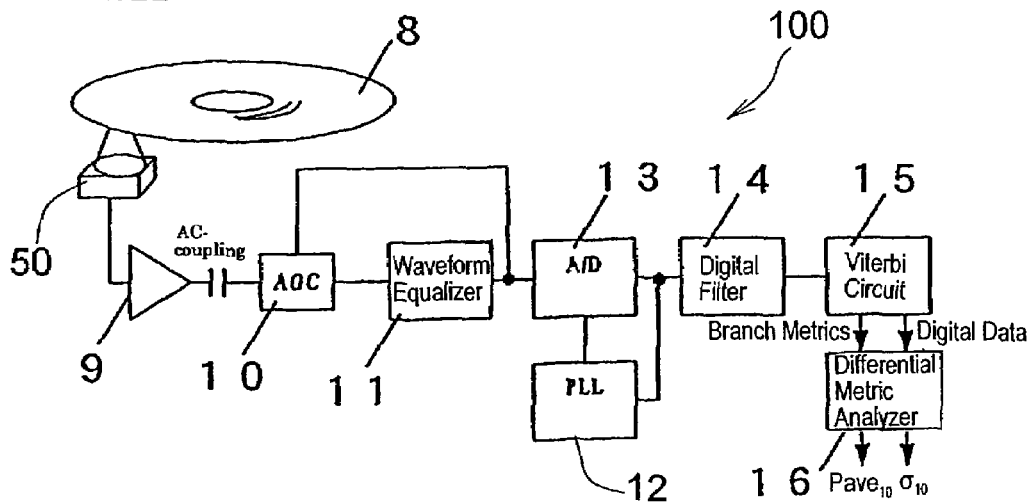
FIG. 11 is a block diagram illustrating a configuration for still another optical disk drive according to the third preferred embodiment.

As another alternative, a read clock signal may also be generated based on the output of the A/D converter 13 (i.e., digital signal) as shown in FIG. 11. Even so, just like the optical disk drive 100 shown in FIG. 7, the optical disk drive 100 shown in FIG. 11 can also obtain the standard deviation and the average and can also evaluate the quality of the read signal by using them.

Figure 12:
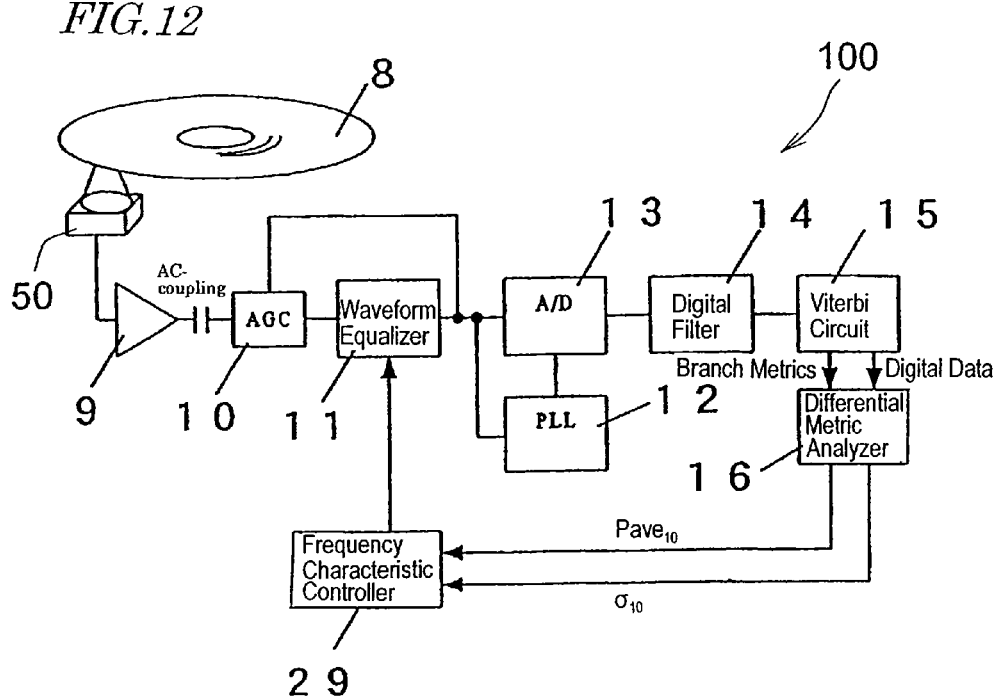
FIG. 12 is a block diagram illustrating a configuration for yet another optical disk drive according to the third preferred embodiment.

In the preferred embodiments described above, the quality of the read signal is evaluated by using the standard deviation $\sigma$ and average Pave of the Pa–Pb distribution, which are output from the differential metric analyzer 16, as respective indices. Optionally, a control operation may also be carried out by using these indices (i.e., the standard deviation $\sigma$ and average Pave) to improve the quality of the read signal. For example, the frequency characteristic of the waveform equalizer 11 may be modified by the frequency characteristic controller 29 shown in FIG. 12 so that the average or the standard deviation output from the differential metric analyzer 16 becomes zero or minimized. Then, the quality of the read signal can also be improved. Furthermore, as for an optical disk drive that can write information on the storage medium, recording parameters can be optimized by controlling the recording power or the degree of recording compensation (e.g., recording pulse width) so that the average or standard deviation, output from the differential metric analyzer 16, becomes zero or minimized.

Embodiment 4

Hereinafter, an optical disk drive according to a fourth specific preferred embodiment of the present invention will be described with reference to FIG. 13.

In this preferred embodiment, the differential metric analyzer 160 outputs the PRML error index MLSA ($M=\sigma/2\cdot d_{min}^2$) as defined by Equation (14). It should be noted that the PRML error index MLSA is obtained by dividing the standard deviation (or root mean square) $\sigma$ of the most probable state transition path from the read signal by the Euclidean distance between the most probable and the second most probable state transition paths. The PRML error index MLSA is an index that can be used to evaluate the quality of the read signal appropriately when the PRML decoding technique is adopted.

Figure 13:
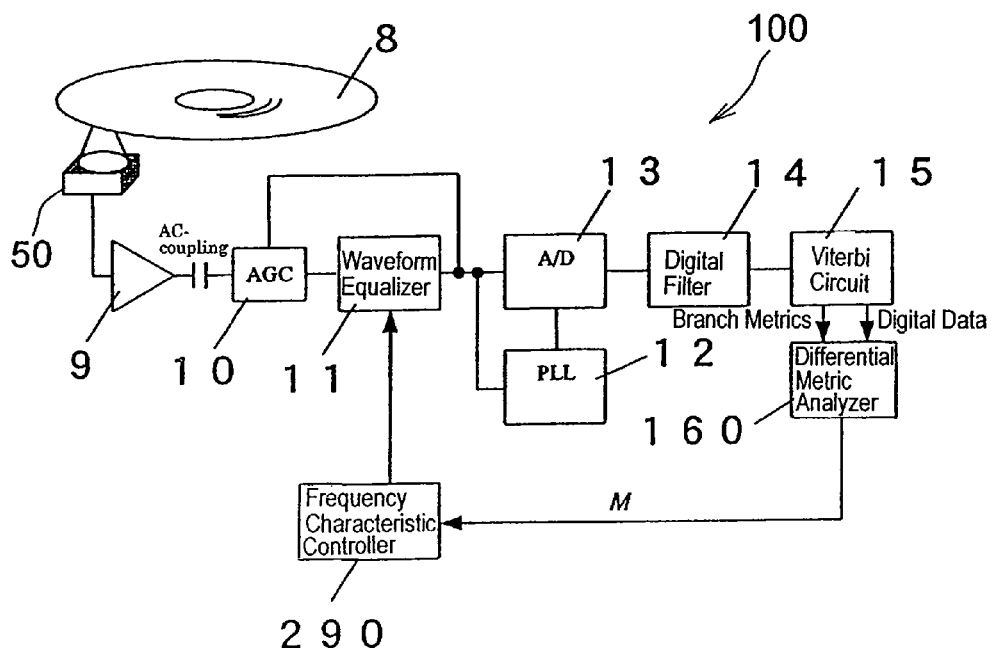
FIG. 13 is a block diagram illustrating a configuration for an optical disk drive according to a fourth specific preferred embodiment of the present invention.

As shown in FIG. 13, the error index MLSA that has been output from the differential metric analyzer 160 is supplied to a frequency characteristic controller 290. The frequency characteristic controller 290 optimizes the characteristics of the waveform equalizer 11 (e.g., the boost level and the boost center frequency thereof) so as to minimize the error index MLSA. For example, the frequency characteristic controller 290 may change the boost level slightly and then compare the PRML error index MLSA resulting from the original boost level with the PRML error index MLSA resulting from the slightly changed boost level. Based on the result of the comparison, the frequency characteristic controller 290 may select one of the two boost levels that has resulted in the smaller MLSA. By performing such an operation repeatedly, the frequency characteristic controller 290 can optimize the characteristics of the waveform equalizer 11 and converge the PRML error index MLSA to a minimum value.

Figure 14:
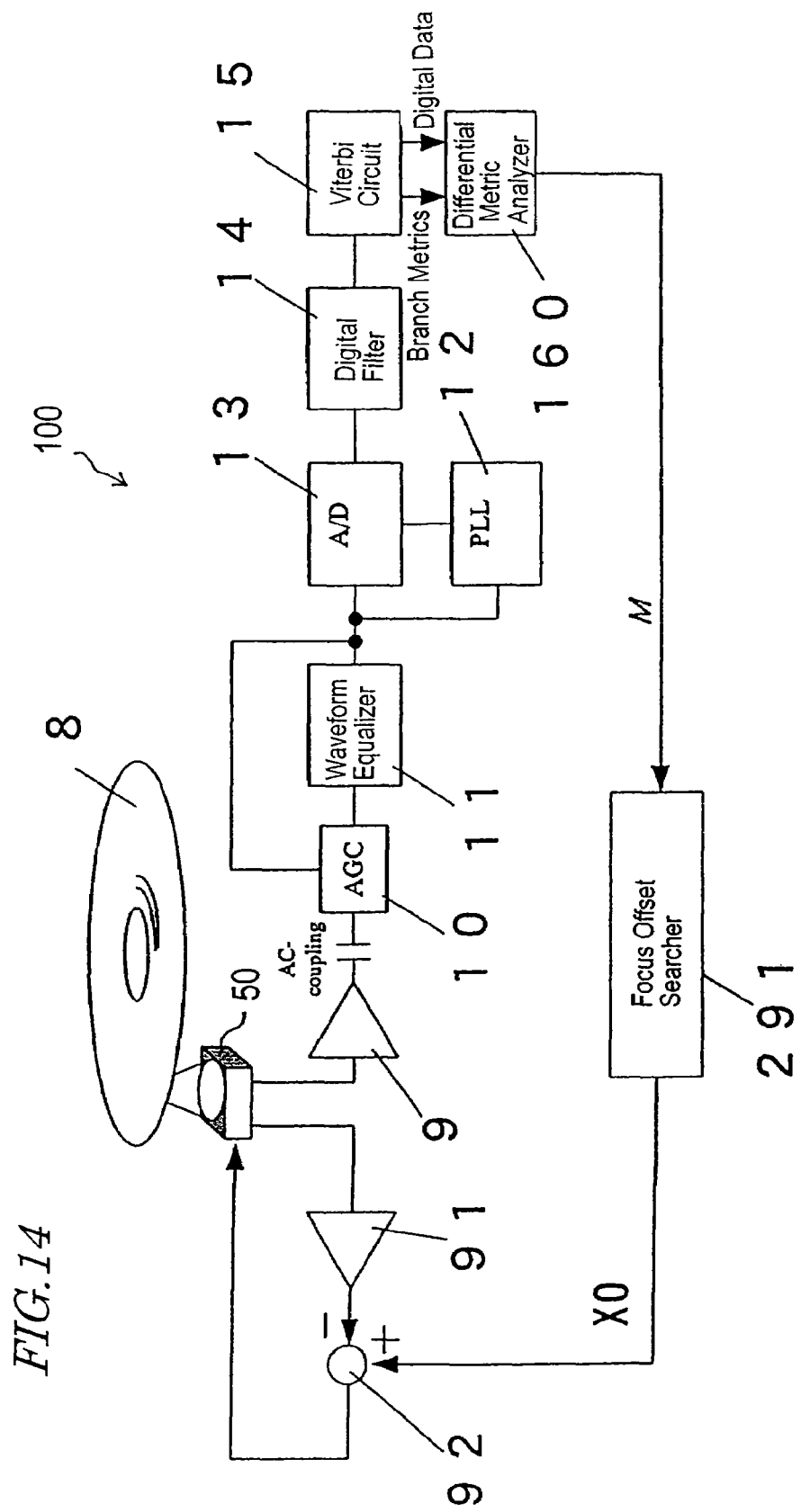
FIG. 14 is a block diagram illustrating a configuration for another optical disk drive according to the fourth preferred embodiment.

As another alternative, the PRML error index MLSA that has been generated by the differential metric analyzer 160 may also be supplied to a focus offset searcher 291 as shown in FIG. 14. In reading a signal from the optical disk 8, the optical disk drive 100 performs a focus servo control so that the light beam emitted from the optical head 50 can always scan the information recording plane of the optical disk 8. This focus servo control is carried out by subjecting the focus actuator (not shown) of the optical head 50 to a feedback control so that the focus error signal that has been detected by a servo amplifier 91 is equalized with a predetermined target value X0 by way of a subtractor 92. In this case, the focus offset searcher 291 may output a value corresponding to the smallest PRML error index MLSA as the predetermined target value X0 to the subtractor 92. Then, the focus servo control may be carried out in such a manner as to minimize the PRML error index MLSA (i.e., to minimize the error rate). It should be noted that such a target value X0 may be searched for by detecting the PRML error index MLSA corresponding to a slightly changed target value X0 and comparing the MLSA value detected with the original MLSA value.

In this preferred embodiment, the focus target value is optimized by using the PRML error index MLSA. Alternatively, the PRML error index MLSA may also be used to optimize any other servo target value. For example, the PRML error index MLSA may also be used for tracking servo control, disk tilt control, lens spherical aberration correction and so on.

Figure 15:
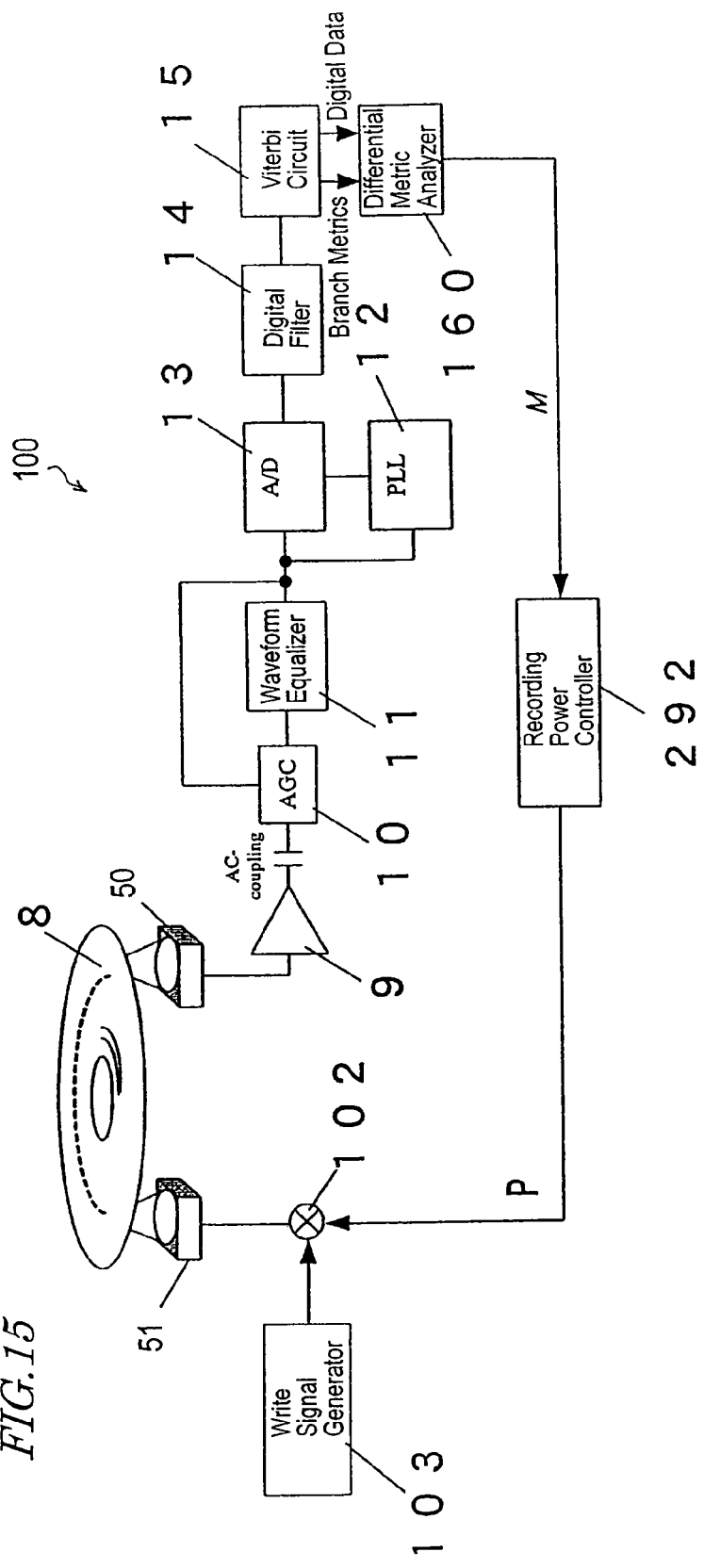
FIG. 15 is a block diagram illustrating a configuration for still another optical disk drive according to the fourth preferred embodiment.

Furthermore, the present invention is also applicable to an optical disk drive including two optical heads 50 and 51 for reading a signal from the optical disk 8 and writing a signal on the optical disk 8, respectively, as shown in FIG. 15. In that case, the recording power may be controlled by reference to the PRML error index MLSA that is output from the differential metric analyzer 160. A signal to be written on the optical disk 8 is generated by a write signal generator 103 and then supplied to the signal writing optical head 51 by way of a modulator 102. The modulator 102 multiplies the write signal by an appropriate, recording power P and then supplies the product to the optical head 51. In this case, the PRML error index MLSA that has been generated by the differential metric analyzer 160 may be supplied to a recording power controller 292. Then, the recording power controller 292 may determine the recording power P in such a manner that the PRML error index MLSA is minimized.

The optical disk drive 100 shown in FIG. 15 gets the read and write operations performed by the two different heads 50 and 51. Alternatively, a single head may be switched to perform the read or write operation selectively. Also, in the preferred embodiment described above, the recording power is controlled by using the PRML error index MLSA. Optionally, the width or the phase of write pulses may also be controlled by reference to the PRML error index MLSA.

Various preferred embodiments of the present invention described above provide a method for evaluating the quality of a read signal that has been decoded by a maximum likelihood decoding method, in which a most probable state transition path is selected from a number n of state transition paths that represent n probable transitions from a first state at a time k−j into a second state at a time k. In this method, supposing the probabilities of state transition of the most and the second most probable state transition paths in a predetermined period j between the times k−j and k (e.g., a sum of Euclidean distances in the predetermined period j) are represented by Pa and Pb, respectively, the reliability of the decoded result obtained in the period j is evaluated by |Pa−Pb|. Also, by measuring the |Pa−Pb| values a number of times and by obtaining the variance of the |Pa−Pb| distribution, error indices, which are correlated with the error rate of the digital decoded result obtained by the maximum likelihood decoding method, can be obtained as indices to the quality of the read signal.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method, executed in an apparatus for reading information including, for evaluating a quality of a read signal in a situation where the read signal corresponding to recorded data coded by a (1, 7) run length limited modulation method is decoded by a partial response (C0, C1, C2, C1, C0) maximum likelihood method, wherein each of C0, C1 and C2 is an arbitrary integer, and wherein the read signal is decoded by a maximum likelihood decoding method, in which a most probable state transition path is selected from a number n, where n is an integer equal to or greater than two, of state transition paths that represent n probable transitions from a first state $S_{k-j}$, where k is an integer equal to or greater than three, j is an integer equal to or greater than two and k is greater than or equal to j, at a time k−j into a second state $S_k$ at a time k, the method comprising steps of:

(a) detecting, based on a result of the maximum likelihood decoding method, m probable state transition paths corresponding to state transition patterns having a smallest Euclidean distance, the m probable state transition paths based on predetermined combinations of the first and second states $S_{k-j}$ and $S_k$ that define the n probable state transition paths in a predetermined period j between the times k−j and k;

(b) calculating, by using the apparatus for reading information, a standard deviation σ of |Pa−Pb|−Pstd in the predetermined period j, where Pa and Pb are indices indicating respective probabilities of state transition of first and second state transition paths in the predetermined period j, the first state transition path being estimated to be either one of the most probable path or the second most probable path, and the second state transition path being estimated to be the other of the most probable path or the second most probable path, among the m probable state transition paths that are defined by the predetermined combinations that have been detected in the step (a), and where Pstd is a sum of squares of differences each between an ideal sample value shown by the first state transition path and an ideal sample value shown by the second state transition path; and (c) evaluating reliability of the decoded signal by using a value σ/2Pstd which is obtained by normalizing the calculated standard deviation σ by twice the value of Pstd.

* * * * *